(12) United States Patent
Lee et al.

(10) Patent No.: US 7,149,842 B2
(45) Date of Patent: Dec. 12, 2006

(54) EFFICIENT UTILIZATION OF SHARED BUFFER MEMORY AND METHOD FOR OPERATING THE SAME

(75) Inventors: Whay Sing Lee, Newark, CA (US); Walter Nixon, Fremont, CA (US); Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 405 days.

(21) Appl. No.: 10/623,026

(22) Filed: Jul. 17, 2003

(65) Prior Publication Data

US 2005/0013302 A1    Jan. 20, 2005

(51) Int. Cl.
*G06F 12/00* (2006.01)
*H04L 12/28* (2006.01)
*G06F 13/00* (2006.01)

(52) U.S. Cl. ............................ 711/5; 711/100; 711/154; 370/395.7

(58) Field of Classification Search .................... 711/5, 711/100, 154, 170, 200; 370/395.7, 412
See application file for complete search history.

(56) References Cited

U.S. PATENT DOCUMENTS

| | | | | |
|---|---|---|---|---|
| 6,209,056 B1* | 3/2001 | Suh | ............................... | 711/5 |
| 6,442,098 B1* | 8/2002 | Kengeri | .................. | 365/230.03 |
| 6,493,347 B1* | 12/2002 | Sindhu et al. | ............... | 370/401 |
| 6,545,934 B1* | 4/2003 | Yamashita et al. | ...... | 365/230.03 |
| 6,891,774 B1* | 5/2005 | Abdollahi-Alibeik et al. | ... | 365/233 |

* cited by examiner

*Primary Examiner*—Tuan V. Thai
(74) *Attorney, Agent, or Firm*—Martine Penilla & Gencarella, LLP

(57) ABSTRACT

Broadly speaking, an apparatus for efficiently utilizing a shared packet buffer memory in a switch and a method for operating the same is provided. More specifically, the apparatus includes a memory having a number of buffers configured to be operated in a ratcheted manner. The ratcheted manner in which the memory is operated causes each incoming data stream to be distributed across the number of buffers. Each stored data stream can also be retrieved from the number of buffers for output from the memory in a similar ratcheted manner. The memory uses a rotating selector to control the ratcheted manner of operation. Also, the memory is capable of simultaneously servicing each of a number of inputs and a number of outputs to which the memory is connected.

27 Claims, 24 Drawing Sheets

| Clock Cycle | 0 | 1 | 2 | 3 | 4 | 5 | 6 | 7 | 8 | 9 |
|---|---|---|---|---|---|---|---|---|---|---|
| $S_0$ | 1 | 0 | 0 | 0 | 1 | 0 | 0 | 0 | 1 | 0 |
| $S_1$ | 0 | 1 | 0 | 0 | 0 | 1 | 0 | 0 | 0 | 1 |
| $S_2$ | 0 | 0 | 1 | 0 | 0 | 0 | 1 | 0 | 0 | 0 |
| $S_3$ | 0 | 0 | 0 | 1 | 0 | 0 | 0 | 1 | 0 | 0 |
| $S_{W0}/S_{R0}$ | {0001} | {0010} | {0100} | {1000} | {0001} | {0010} | {0100} | {1000} | {0001} | {0010} |
| $S_{W1}/S_{R1}$ | {1000} | {0001} | {0010} | {0100} | {1000} | {0001} | {0010} | {0100} | {1000} | {0001} |
| $S_{W2}/S_{R2}$ | {0100} | {1000} | {0001} | {0010} | {0100} | {1000} | {0001} | {0010} | {0100} | {1000} |
| $S_{W3}/S_{R3}$ | {0010} | {0100} | {1000} | {0001} | {0010} | {0100} | {1000} | {0001} | {0010} | {0100} |

Fig. 3

EFFICIENT UTILIZATION OF SHARED BUFFER MEMORY AND METHOD FOR OPERATING THE SAME

CROSS REFERENCE TO RELATED APPLICATIONS

This application is related to U.S. patent application Ser. No. 10/623,088, filed on even date herewith, and entitled "Bandwidth Matching Device and Method for Operating the Same," and U.S. patent application Ser. No. 10/623,083, filed on even date herewith, and entitled "Time Slicing Device for Shared Resources and Method for Operating the Same." The disclosures of both of these related applications are incorporated herein by reference.

BACKGROUND OF THE INVENTION

1. Field of the Invention

The present invention relates generally to a digital memory.

2. Description of the Related Art

In modern electronic devices, switches are used to connect a number of senders to a number of receivers, such that any of the senders can deliver a data stream (or packet) to any of the receivers. To accommodate variability in communication between the senders and receivers, the switches may use packet buffer memories to store packets received from the senders, which cannot immediately be transmitted to the intended receivers.

One conventional packet buffer memory configuration uses an input buffer connected to each of a number of input ports, wherein a different input buffer is connected to a different one of the number of input ports. Each of the different input buffers associated with the number of input ports is connected to a switching substrate (e.g., crossbar switch or shared bus) which is connected to a number of output ports. In this configuration, if there are two packets stored in the same input buffer, but destined for different output ports, only one packet can make progress even if both output ports are available. This situation exists because the two packets share a common connectivity into the switching substrate. Also in this configuration, the input buffer associated with the input port that is receiving the packet must have sufficient space available to receive the entire packet. The packet cannot be stored in another input buffer associated with another input port.

Another conventional packet buffer memory configuration uses an output buffer connected to each of a number of output ports, wherein a different output buffer is connected to a different one of the number of output ports. Each of the different output buffers associated with the number of output ports are connected to a switching substrate (e.g., crossbar switch or shared bus) which is also connected to a number of input ports. In this configuration, if two packets arrive from two different input ports at the same time and are destined for a common output port, only one packet can make progress. This situation exists because the two packets must share a connectivity into the common output port. Also in this configuration, a packet may be stored in any available output buffer, but the entire packet must be stored in the same output buffer. Therefore, the output buffer must have sufficient space to store the packet before the packet can progress.

In either of the conventional packet buffer memory configurations mentioned above, a complicated buffer allocation mechanism is required to achieve efficient utilization of the input ports, output ports, and buffer memories. In order to avoid contention for resources when a new packet arrives, the system must take into account a number of factors, among others, such as (a) availability of space in each buffer, (b) whether a packet is currently being deposited into or retrieved from each buffer, and (c) the number of packets that are currently waiting for deposition in each buffer.

In view of the foregoing, there is a need for a more efficient shared buffering solution that can be implemented without requiring either a complicated buffer allocation scheme or high speed memory circuitry.

SUMMARY OF THE INVENTION

Broadly speaking, the present invention fills these needs by providing an apparatus for efficiently utilizing a shared packet buffer memory in a switch and a method for operating the same. More specifically, the apparatus of the present invention includes a memory having a number of buffers configured to be operated in a ratcheted manner. The ratcheted manner in which the memory is operated causes each incoming data stream to be distributed across the number of buffers. Since each incoming data stream is stored in a distributed manner, a complicated buffer allocation scheme is not required. Each stored data stream can also be retrieved from the number of buffers for output from the memory in a similar ratcheted manner. The memory uses a common rotating selector to control the ratcheted manner of operation. Also, the memory is capable of simultaneously servicing each of a number of inputs and a number of outputs to which the memory is connected.

In one embodiment, a switch is disclosed. The switch includes a set of inputs and a set of memory banks. A number of memory banks in the set of memory banks is equal to a number of inputs in the set of inputs. Each input is capable of transferring a data stream into the set of memory banks. The data stream transferred by each input is distributed across each of the set of memory banks. The switch further includes a set of outputs having a number outputs equal to the number of memory banks. Each data stream distributed across each of the set of memory banks is to be output from at least one output in the set of outputs.

In another embodiment, a memory is disclosed. The memory includes a number of inputs that are each capable of receiving a data stream to be stored in the memory. The memory also includes memory banks equal in number to the inputs. The memory banks are for storing the data streams received by the inputs. A first ratcheting distributor is provided for distributing the data stream received by either of the inputs across the memory banks. The ratcheting distributor distributes the data stream such that one or more of the memory banks contains a distinct portion of the data stream. The memory further includes a number of outputs that are each capable of providing the stream previously stored in the memory. The distinct portion of the data stream contained within either of the memory banks is provided to either of the number of outputs by a second ratcheting distributor.

In another embodiment, a ratcheting distributor for distributing a data stream across a number of memory banks is disclosed. The ratcheting distributor includes a number of multiplexers that are each configured to receive a number of inputs and one of a number of selector signals. Each of the multiplexers has an output connected to one of the memory banks such that one of the multiplexers is connected to each of the memory banks. The selector signal received by each multiplexer is capable of controlling which of the number of inputs will be transmitted to the output. Each of the number of selector signals is defined by a different ordering of a number of individual signals. The number of individual signals is equal to the number of inputs. The ratcheting distributor also includes a rotating selector capable of generating the number of individual signals used to define the selector signals. On a given clock cycle, the rotating selector causes one of the individual signals to be a high signal and each of the remaining individual signals to be a low signal. The rotating selector further causes the high signal to be rotated among the number of individual signals on successive clock cycles. The ratcheting distributor also includes a clock for exercising the rotating selector.

In another embodiment, a method for operating a memory is disclosed. One aspect of the method includes receiving a number of inputs that each represent a data stream to be stored in the memory, wherein each of the number of inputs can be received simultaneously. The data stream associated with each of the inputs is distributed across a number of memory banks. Distribution of the data stream across the memory banks is performed such that a portion of the data stream is stored in each of the memory banks as required to completely store the data stream. Another aspect of the method includes retrieving the portion of the data stream stored in each of the memory banks. The portion of the data stream retrieved from storage in each of the memory banks is transmitted to an output such that the data stream is provided at the output.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which:

FIG. 3 is an illustration showing a table of selector signals corresponding to clock cycles 0 through 9, in accordance with the embodiment illustrated in FIGS. 1 and 2;

DETAILED DESCRIPTION

Broadly speaking, the present invention provides an apparatus for efficiently utilizing a shared packet buffer memory in a switch and a method for operating the same. More specifically, the apparatus of the present invention includes a memory having a number of buffers configured to be operated in a ratcheted manner. The ratcheted manner in which the memory is operated causes each incoming data stream to be distributed across the number of buffers. Since each incoming data stream is stored in a distributed manner, a complicated buffer allocation scheme is not required. Each stored data stream can also be retrieved from the number of buffers for output from the memory in a similar ratcheted manner. The memory uses a rotating selector to control the ratcheted manner of operation. Also, the memory is capable of simultaneously servicing each of a number of inputs and a number of outputs to which the memory is connected. It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
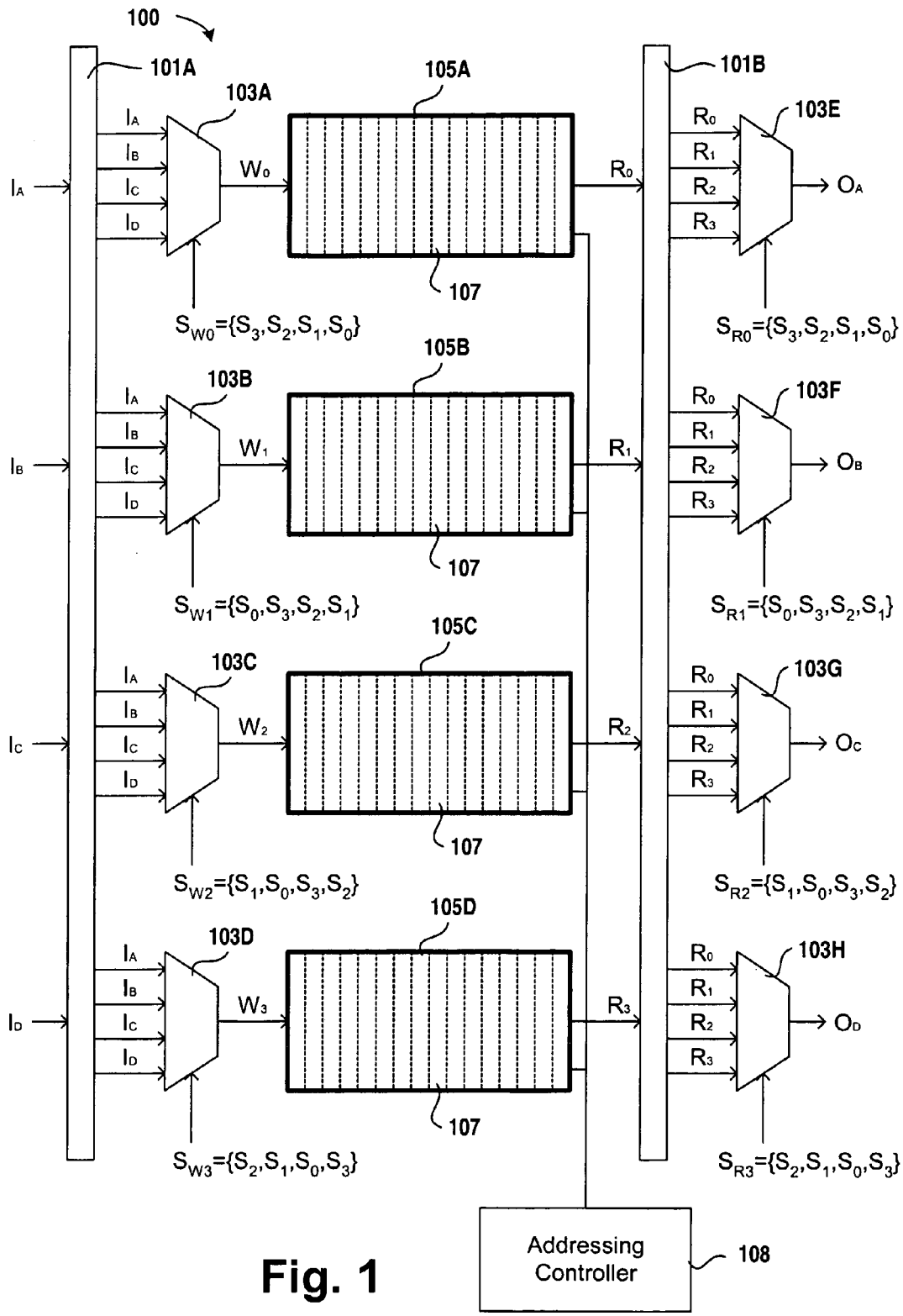
FIG. 1 is an illustration showing a memory, in accordance with one embodiment of the present invention.

FIG. 1 is an illustration showing a memory 100, in accordance with one embodiment of the present invention. The memory 100 is capable of accepting four inputs $I_A$, $I_B$, $I_C$, and $I_D$ and providing four outputs $O_A$, $O_B$, $O_C$, and $O_D$. The number of inputs and outputs associated with the memory 100 are selected for exemplary purposes. In other embodiments, the memory 100 can include a different number of inputs and outputs. Each of the inputs $I_A$, $I_B$, $I_C$, and $I_D$ are connected to four multiplexers (MUXs) 103A, 103B, 103C, and 103D. For purposes of illustration, a bus 101A is used to connect the four inputs $I_A$, $I_B$, $I_C$, and $I_D$ to each of the MUXs 103A, 103B, 103C, and 103D. In actuality, the bus 101A can be considered to represent direct connections between each of the inputs $I_A$, $I_B$, $I_C$, and $I_D$ and each of the MUXs 103A, 103B, 103C, and 103D. Each MUX 103A, 103B, 103C, and 103D receives a selector signal $S_{W0}$, $S_{W1}$, $S_{W2}$, and $S_{W3}$, respectively. Also, each MUX 103A, 103B, 103C, and 103D has an output $W_0$, $W_1$, $W_2$, and $W_3$, respectively, connected to a buffer (i.e., a memory bank) 105A, 105B, 105C, and 105D, respectively. In this manner, each output $W_0$, $W_1$, $W_2$, and $W_3$ serves as a write input to each buffer 105A, 105B, 105C, and 105D, respectively. Each selector signal $S_{W0}$, $S_{W1}$, $S_{W2}$, and $S_{W3}$ is used to control which of the inputs $I_A$, $I_B$, $I_C$, and $I_D$ will be transmitted to the output $W_0$, $W_1$, $W_2$, and $W_3$ of each of the MUXs 103A, 103B, 103C, and 103D, respectively. Thus, each selector signal $S_{W0}$, $S_{W1}$, $S_{W2}$, and $S_{W3}$ controls which of the inputs $I_A$, $I_B$, $I_C$, and $I_D$ will be written through the outputs $W_0$, $W_1$, $W_2$, and $W_3$ to each of the buffers 105A, 105B, 105C, and 105D, respectively.

Each buffer 105A, 105B, 105C, and 105D contains a number of data storage locations 107 that are each capable of storing a word of data. Each buffer 105A, 105B, 105C, and 105D is also configured to communicate with an addressing controller 108. The addressing controller 108 provides each buffer with information related to which data storage location 107 is to be access in a particular input or output operation. Each buffer 105A, 105B, 105C, and 105D is also dual-ported to have the capability of simultaneously receiving input and providing output. In following, each buffer 105A, 105B, 105C, and 105D is connected to a read output $R_0$, $R_1$, $R_2$, and $R_3$, respectively. Each read output $R_0$, $R_1$, $R_2$, and $R_3$ is connected to four MUXs 103E, 103F 103G, and 103H. For purposes of illustration, a bus 101B is used to connect each read output $R_0$, $R_1$, $R_2$, and $R_3$ to each of the MUXs 103E, 103F 103G, and 103H. In actuality, the bus 101B can be considered to represent direct connections between each read output $R_0$, $R_1$, $R_2$, and $R_3$ and each of the MUXs 103E, 103F 103G, and 103H. Each MUX 103E, 103F, 103G, and 103H receives a selector signal $S_{R0}$, $S_{R1}$, $S_{R2}$, and $S_{R3}$, respectively. Also, each MUX 103E, 103F, 103G, and 103H has an output $O_A$, $O_B$, $O_C$, and $O_D$, respectively, corresponding to the outputs of the memory 100. Each of the inputs $I_A$, $I_B$, $I_C$, and $I_D$, each of the write inputs $W_0$, $W_1$, $W_2$, and $W_3$, each of the read outputs $R_0$, $R_1$, $R_2$, and $R_3$, and each of the outputs $O_A$, $O_B$, $O_C$, and $O_D$ have the same bandwidth capability.

In the embodiment of FIG. 1, each of the selector signals $S_{W0}$, $S_{W1}$, $S_{W2}$, $S_{W3}$, $S_{R0}$, $S_{R1}$, $S_{R2}$, and $S_{R3}$ consists of four 1-bit signals with one of the 1-bit signals having a first digital state and the remainder of the 1-bit signals having a second digital state. In one embodiment, the first digital state is a high state and the second digital state is a low state. In another embodiment, the first digital state is a low state and the second digital state is a high state. For purposes of discussion and illustration, the remainder of this document will consider the first digital state to be a high state and the second digital state to be a low state. The number of 1-bit signals in the selector signal of a particular MUX is equal to the number of inputs received by the MUX. Since each of the MUXs 103A–103H is configured to receive four inputs, each selector signal contains four 1-bit signals. In other embodiments, the memory 100 may include a different number of inputs and buffers with a correspondingly different number of inputs to each MUX. In these other embodiments, the number of 1-bit signals in the selector signal of a particular MUX will continue to be equal to the number of inputs received by the MUX, with one 1-bit signal being high at a given time.

The ordering of the 1-bit signals in the selector signals vary between the MUXs. Selector signals $S_{W0}$ and $S_{R0}$ have a 1-bit signal ordering of $\{S_3,S_2,S_1,S_0\}$ and correspond to MUXs 103A and 103E, respectively. Selector signals $S_{W1}$ and $S_{R1}$ have a 1-bit signal ordering of $\{S_0,S_3,S_2,S_1\}$ and correspond to MUXs 103B and 103F, respectively. Selector signals $S_{W2}$ and $S_{R2}$ have a 1-bit signal ordering of $\{S_1,S_0,S_3,S_2\}$ and correspond to MUXs 103C and 103G, respectively. Selector signals $S_{W3}$ and $S_{R3}$ have a 1-bit signal ordering of $\{S_2,S_1,S_0,S_3\}$ and correspond to MUXs 103D and 103H, respectively. Each of the selector signals maintains a common sequence of 1-bit signals. However, the common sequence of 1-bit signals is successively shifted by a bit position to create each of the selector signals. Thus, the high 1-bit signal will have a different bit position in each of the selector signals at a given time. The high 1-bit signal determines which of the inputs received by the MUX will be transmitted to the output of the MUX.

With respect to MUX 103A, if the 1-bit signal $S_0$ is high in selector signal $S_{W0}$, input $I_A$ will be transmitted to output $W_0$. If the 1-bit signal $S_1$ is high in selector signal $S_{W0}$, input $I_B$ will be transmitted to output $W_0$. If the 1-bit signal $S_2$ is high in selector signal $S_{W0}$, input $I_C$ will be transmitted to output $W_0$. If the 1-bit signal $S_3$ is high in selector signal $S_{W0}$, input $I_D$ will be transmitted to output $W_0$.

With respect to MUX 103B, if the 1-bit signal $S_1$ is high in selector signal $S_{W1}$, input $I_A$ will be transmitted to output $W_1$. If the 1-bit signal $S_2$ is high in selector signal $S_{W1}$, input $I_B$ will be transmitted to output $W_1$. If the 1-bit signal $S_3$ is high in selector signal $S_{W1}$, input $I_C$ will be transmitted to output $W_1$. If the 1-bit signal $S_0$ is high in selector signal $S_{W1}$, input $I_D$ will be transmitted to output $W_1$.

With respect to MUX 103C, if the 1-bit signal $S_2$ is high in selector signal $S_{W2}$, input $I_A$ will be transmitted to output $W_2$. If the 1-bit signal $S_3$ is high in selector signal $S_{W2}$, input $I_B$ will be transmitted to output $W_2$. If the 1-bit signal $S_0$ is high in selector signal $S_{W2}$, input $I_C$ will be transmitted to output $W_2$. If the 1-bit signal $S_1$ is high in selector signal $S_{W2}$, input $I_D$ will be transmitted to output $W_2$.

With respect to MUX 103D, if the 1-bit signal $S_3$ is high in selector signal $S_{W3}$, input $I_A$ will be transmitted to output $W_3$. If the 1-bit signal $S_0$ is high in selector signal $S_{W3}$, input $I_B$ will be transmitted to output $W_3$. If the 1-bit signal $S_1$ is high in selector signal $S_{W3}$, input $I_C$ will be transmitted to output $W_3$. If the 1-bit signal $S_2$ is high in selector signal $S_{W3}$, input $I_D$ will be transmitted to output $W_3$.

With respect to MUX 103E, if the 1-bit signal $S_0$ is high in selector signal $S_{R0}$, input $R_0$ will be transmitted to output $O_A$. If the 1-bit signal $S_1$ is high in selector signal $S_{R0}$, input $R_1$ will be transmitted to output $O_A$. If the 1-bit signal $S_2$ is high in selector signal $S_{R0}$, input $R_2$ will be transmitted to output $O_A$. If the 1-bit signal $S_3$ is high in selector signal $S_{R0}$, input $R_3$ will be transmitted to output $O_A$.

With respect to MUX 103F, if the 1-bit signal $S_1$ is high in selector signal $S_{R1}$, input $R_0$ will be transmitted to output $O_B$. If the 1-bit signal $S_2$ is high in selector signal $S_{R1}$, input $R_1$ will be transmitted to output $O_B$. If the 1-bit signal $S_3$ is high in selector signal $S_{R1}$, input $R_2$ will be transmitted to output $O_B$. If the 1-bit signal $S_0$ is high in selector signal $S_{R1}$, input $R_3$ will be transmitted to output $O_B$.

With respect to MUX 103G, if the 1-bit signal $S_2$ is high in selector signal $S_{R2}$, input $R_0$ will be transmitted to output $O_C$. If the 1-bit signal $S_3$ is high in selector signal $S_{R2}$, input $R_1$ will be transmitted to output $O_C$. If the 1-bit signal $S_0$ is high in selector signal $S_{R2}$, input $R_2$ will be transmitted to output $O_C$. If the 1-bit signal $S_1$ is high in selector signal $S_{R2}$, input $R_3$ will be transmitted to output $O_C$.

With respect to MUX 103H, if the 1-bit signal $S_3$ is high in selector signal $S_{R3}$, input $R_0$ will be transmitted to output $O_D$. If the 1-bit signal $S_0$ is high in selector signal $S_{R3}$, input $R_1$ will be transmitted to output $O_D$. If the 1-bit signal $S_1$ is high in selector signal $S_{R3}$, input $R_2$ will be transmitted to output $O_D$. If the 1-bit signal $S_2$ is high in selector signal $S_{R3}$, input $R_3$ will be transmitted to output $O_D$.

Figure 2:
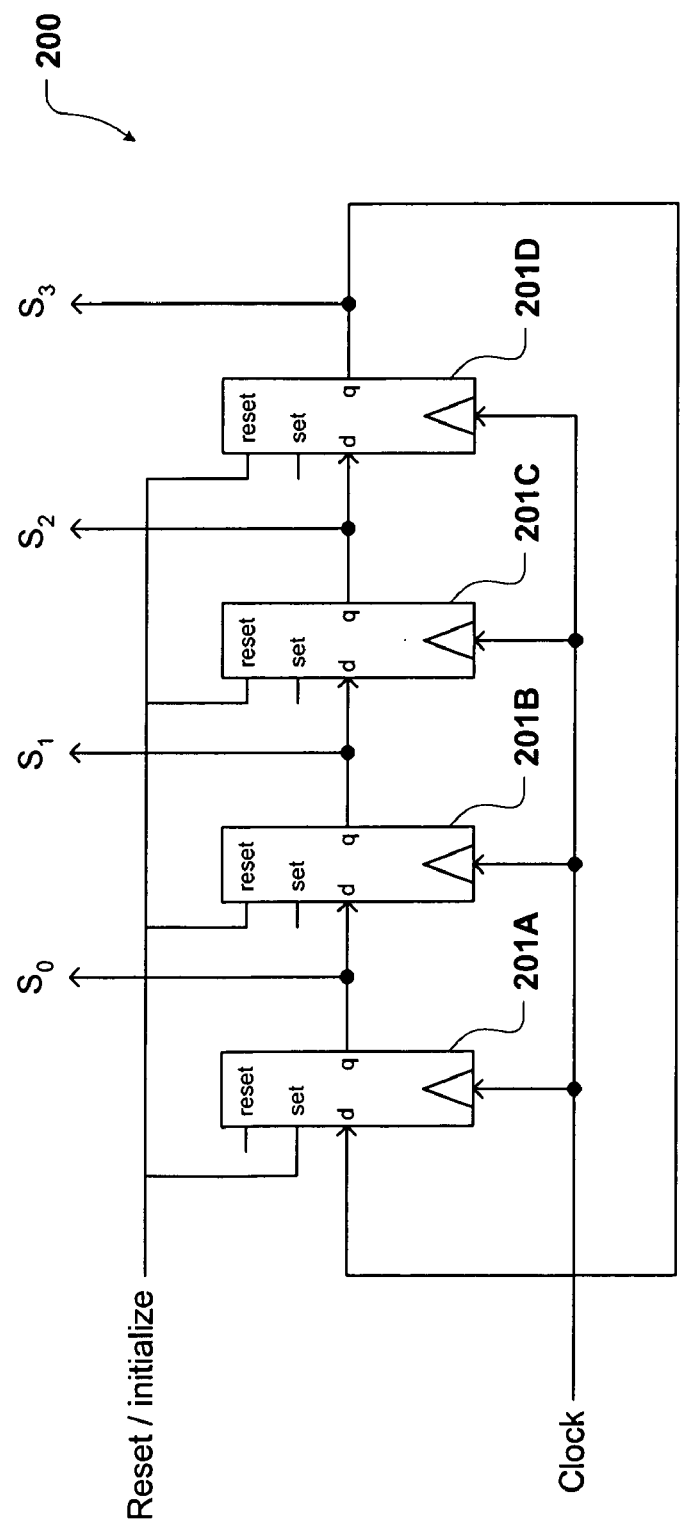
FIG. 2 is an illustration showing a rotating selector (i.e., ratchet), in accordance with one embodiment of the present invention.

FIG. 2 is an illustration showing a rotating selector (i.e., ratchet) 200, in accordance with one embodiment of the present invention. The rotating selector 200 generates the 1-bit signals used to define each of the selector signals. The rotating selector 200 includes a number of cells 201A–201D corresponding to the number of 1-bit signals needed to generate each of the selector signals. Each cell 201A–201D receives a binary input (d) and a clock input and generates a binary output (q). The exemplary embodiment of FIG. 2 corresponds to the memory 100 of FIG. 1. Thus, four 1-bit signals $S_0$, $S_1$, $S_2$, and $S_3$ are generated by the cells 201A, 201B, 201C, and 201D, respectively. In one embodiment, each of the cells 201A–201D can be an edge-triggered cell such as a flip-flop. Upon receipt of a clock signal indicating a clock cycle, each of the cells 201A–201D will change the value of its internal state, and therefore its output (q), to take on the current value of its input. Thus, each of the cells 201A–201D transmits its state to the next cell in the sequence at each clock cycle.

Each of the cells 201A–201D also includes a reset and set connection. Receipt of a high signal on the reset connection will cause the cell to hold a low signal. Receipt of a high signal on the set connection will cause the cell to hold a high signal. In the embodiment of FIG. 2, a reset/initialize signal is connected to the set connection of cell 201A and to the reset connection of cells 201B–201D. Thus, in the embodiment of FIG. 2, the cells 201A–201D can be initialized or reset such that cell 201A holds a high signal and each of cells 201B–201D holds a low signal. After initialization, the first clock cycle will cause cell 201B to generate a high signal and each of cells 201A, 201C, and 201D to generate a low signal. Thus, before the first clock cycle, $S_0$ is a high signal and $S_1$, $S_2$, and $S_3$ are low signals. In succeeding clock cycles, the high signal will rotate in sequence from $S_0$ to $S_1$ to $S_2$ to $S_3$ and back to $S_0$ to start the rotation again. Therefore, one instance of the rotating selector 200 circuitry is needed to generate all of the 1-bit signals $S_0$, $S_1$, $S_2$, and $S_3$ needed to define each of the selector signals $S_{W0}$, $S_{W1}$, $S_{W2}$, $S_{W3}$, $S_{R0}$, $S_{R1}$, $S_{R2}$, and $S_{R3}$. Hence, each of the selector signals $S_{W0}$, $S_{W1}$, $S_{W2}$, $S_{W3}$, $S_{R0}$, $S_{R1}$, $S_{R2}$, and $S_{R3}$ can be defined without using explicit arbitration circuitry.

FIG. 3 is an illustration showing a table of selector signals corresponding to clock cycles 0 through 9, in accordance with the embodiment illustrated in FIGS. 1 and 2. In clock cycle 0, the 1-bit signal $S_0$ is high and the remaining 1-bit signals $S_1$, $S_2$, and $S_3$ are low. In clock cycle 1, the 1-bit signal $S_1$ is high and the remaining 1-bit signals $S_2$, $S_3$, and $S_0$ are low. In clock cycle 2, the 1-bit signal $S_2$ is high and the remaining 1-bit signals $S_3$, $S_0$, and $S_1$ are low. In clock cycle 3, the 1-bit signal $S_3$ is high and the remaining 1-bit signals $S_0$, $S_1$, and $S_2$ are low. In clock cycle 4, the 1-bit signal $S_0$ is high again and the remaining 1-bit signals $S_1$, $S_2$, and $S_3$ are low again. The rotating of the high signal among the 1-bit signals continues in the same manner through the remaining clock cycles.

The rotation of the high signal among the 1-bit signals at each clock cycle has a corresponding effect on the selection signals for each of the MUXs. At a given clock cycle, the high signal occupies a different bit position in each of the selector signals $S_{W0}/S_{R0}$, $S_{W1}/S_{R1}$, $S_{W2}/S_{R2}$, and $S_{W3}/S_{R3}$. In this manner, the selector signals $S_{W0}$, $S_{W1}$, $S_{W2}$, and $S_{W3}$ control the MUXs 103A, 103B, 103C, and 103D, respectively, such that a data stream arriving at a given input will be distributed among the buffers 105A, 105B, 105C, and 105D as the clock cycles. In a similar manner, the selector signals $S_{R0}$, $S_{R1}$, $S_{R2}$, and $S_{R3}$ control the MUXs 103E, 103F, 103G, and 103H, respectively, such that a data stream to be provided to a given output will be retrieved from the buffers 105A, 105B, 105C, and 105D as the clock cycles. Thus, the MUXs 103A, 103B, 103C, and 103D, along with the rotating selector 200, serve as a ratcheting distributor for distributing the data streams arriving at the various inputs $I_A$, $I_B$, $I_C$, and $I_D$ among the buffers 105A, 105B, 105C, and 105D. Also, the MUXs 103E, 103F, 103G, and 103H, along with the rotating selector 200, serve as a ratcheting distributor for retrieving and transmitting the distributed data streams from among the buffers 105A, 105B, 105C, and 105D to the outputs $O_A$, $O_B$, $O_C$, and $O_D$. The operation of the memory 100 can be described more completely by way of example. FIGS. 4A–13B show an example of the rotating selector 200 and the memory 100 operation through ten clock cycles (cycle 0 through cycle 9).

Figure 4A:
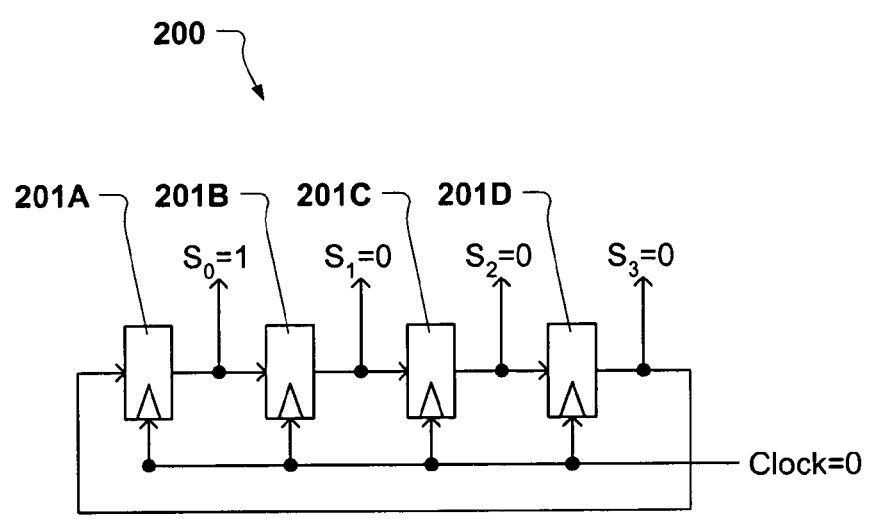
FIG. 4A is an illustration showing the rotating selector at a clock cycle 0, in accordance with one embodiment of the present invention.
Figure 4B:
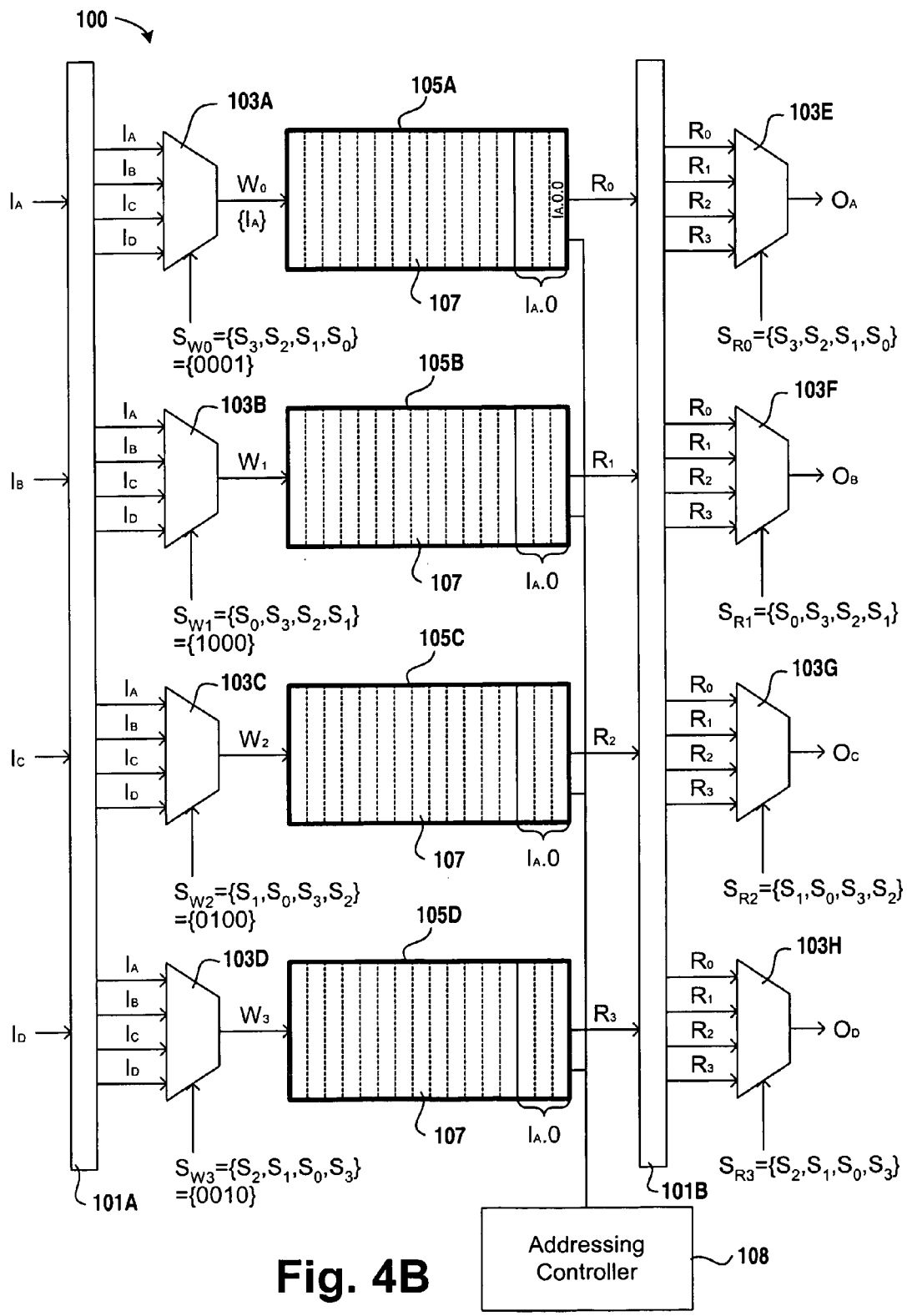
FIG. 4B is an illustration showing the memory at the clock cycle 0, in accordance with one embodiment of the present invention.

FIG. 4A is an illustration showing the rotating selector 200 at a clock cycle 0, in accordance with one embodiment of the present invention. FIG. 4B is an illustration showing the memory 100 at the clock cycle 0, in accordance with one embodiment of the present invention. Prior to the clock cycle 0 a number of data streams arrive at inputs $I_A$, $I_B$, $I_C$, and $I_D$. A memory controller receives requests from inputs $I_A$, $I_B$, $I_C$, and $I_D$ to store the incoming data streams. The memory controller instructs the memory 100 to begin storing data streams incoming at inputs $I_A$, $I_B$, $I_C$, and $I_D$ when $S_{W0}$ is {0001}, {0010}, {0100}, and {1000}, respectively.

At the clock cycle 0, $S_{W0}$ is {0001}. Therefore, at the clock cycle 0, MUX 103A transmits a portion (i.e., a word) of the input $I_A$ data stream through output $W_0$ to buffer 105A. Also, at or before the clock cycle 0 the addressing controller 108 establishes a data block across buffers 105A–105D for storage of the input $I_A$ data stream. For illustrative purposes, the data block established for the input $I_A$ data stream is identified by bracketed regions labeled $I_A.0$ at each buffer 105A–105D. The label $I_A.0$ refers to input $I_A$ and data stream 0. In the current example, three data storage locations 107 are allocated within each buffer 105A–105D for storage of the input $I_A$ data stream. The portion of the input $I_A$ data stream stored in buffer 105A at the clock cycle 0 is indicated by $I_A.0.0$, wherein the input identifier is $I_A$, the data stream identifier is 0, and the portion identifier is 0.

In one embodiment, the addressing controller 108 will be provided information regarding the size of the incoming data stream to determine the number of data storage locations needed within each buffer to completely store the data stream. In one embodiment, the information regarding the size of the incoming data stream may be contained within a header of the data stream. In another embodiment, the information regarding the size of the incoming data stream may be discernable from the source of the incoming data stream.

Figure 5A:
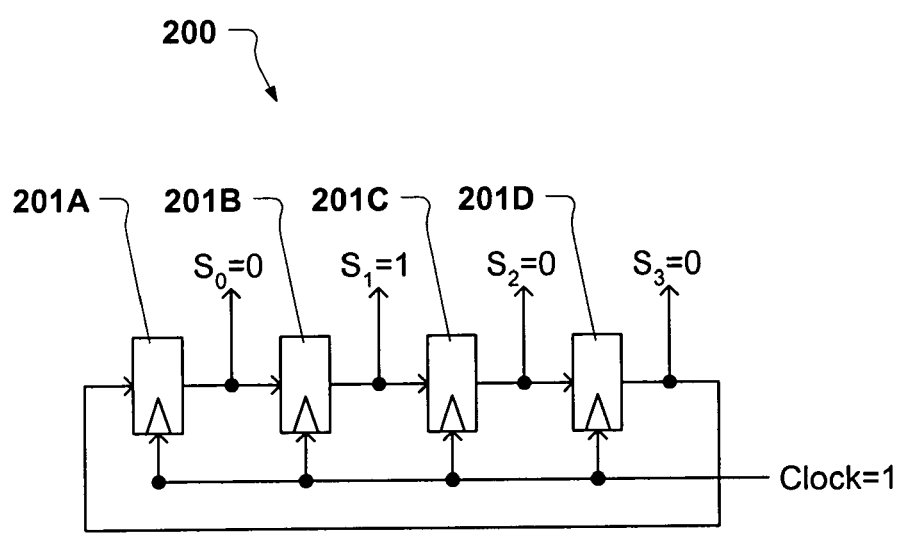
FIG. 5A is an illustration showing the rotating selector at a clock cycle 1, in accordance with one embodiment of the present invention.
Figure 5B:
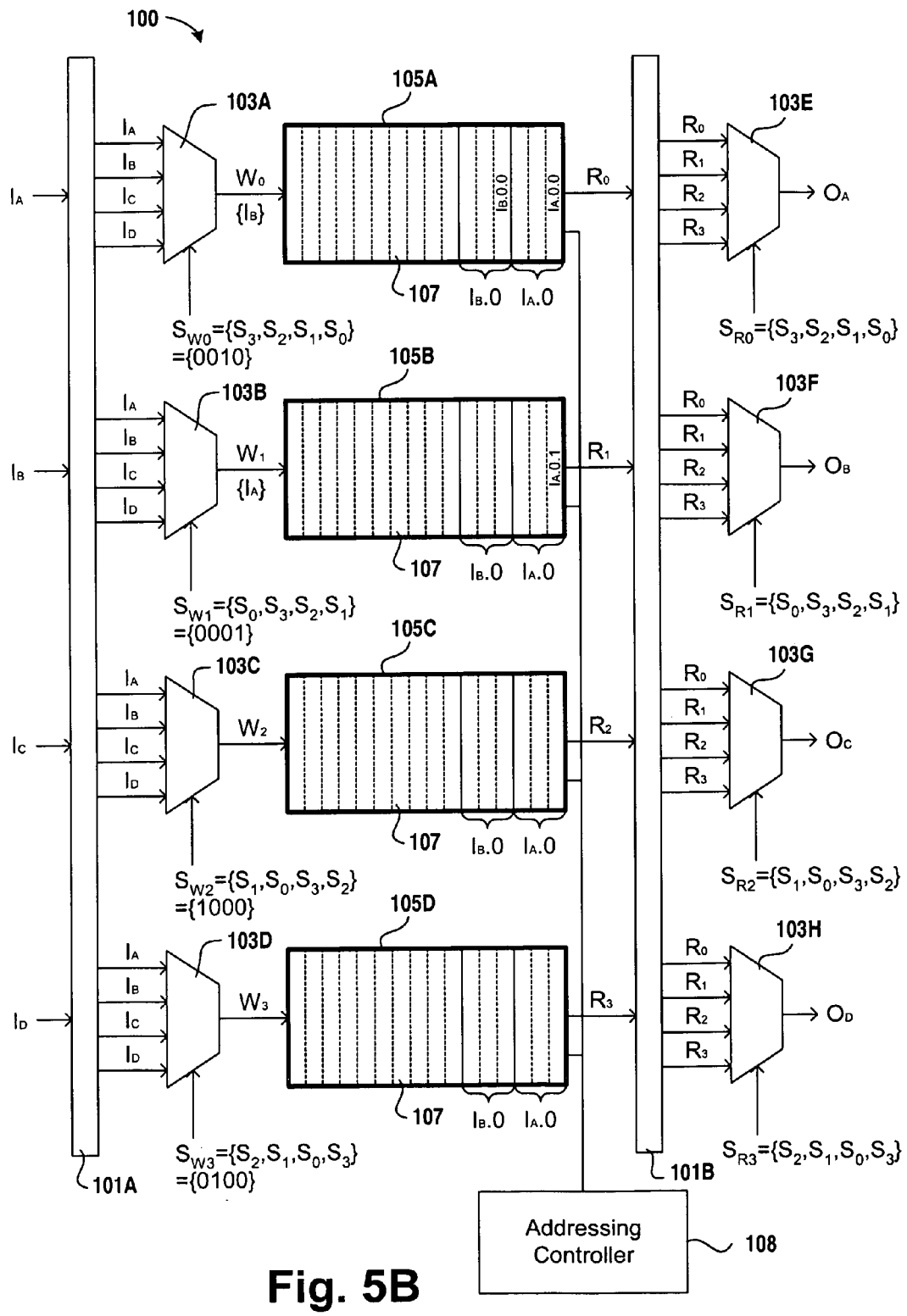
FIG. 5B is an illustration showing the memory at the clock cycle 1, in accordance with one embodiment of the present invention.

FIG. 5A is an illustration showing the rotating selector 200 at a clock cycle 1, in accordance with one embodiment of the present invention. FIG. 5B is an illustration showing the memory 100 at the clock cycle 1, in accordance with one embodiment of the present invention. At the clock cycle 1, $S_{W0}$ is {0010}. Therefore, at the clock cycle 1, MUX 103A transmits a portion of the input $I_B$ data stream through output $W_0$ to buffer 105A. Also, at or before the clock cycle 1 the addressing controller 108 establishes a data block across buffers 105A–105D for storage of the input $I_B$ data stream. For illustrative purposes, the data block established for the input $I_B$ data stream is identified by bracketed regions labeled $I_B.0$ at each buffer 105A–105D. The label $I_B.0$ refers to input $I_B$ and data stream 0. In the current example, three data storage locations 107 are allocated within each buffer 105A–105D for storage of the input $I_B$ data stream. The portion of the input $I_B$ data stream stored in buffer 105A at the clock cycle 1 is indicated by $I_B.0.0$, wherein the input identifier is $I_B$, the data stream identifier is 0, and the portion identifier is 0.

Also, at the clock cycle 1, the selector signal $S_{W1}$ is {0001} which instructs MUX 103B to transmit a next portion of the input $I_A$ data stream through output $W_1$ to buffer 105B. The addressing controller 108 directs the buffer 105B to store the next portion of the input $I_A$ data stream at the next available data storage location 107 allocated for $I_A.0$ in the buffer 105B. The next portion of the input $I_A$ data stream stored in buffer 105B at the clock cycle 1 is indicated by $I_A.0.1$, wherein the portion identifier is 1.

Figure 6A:
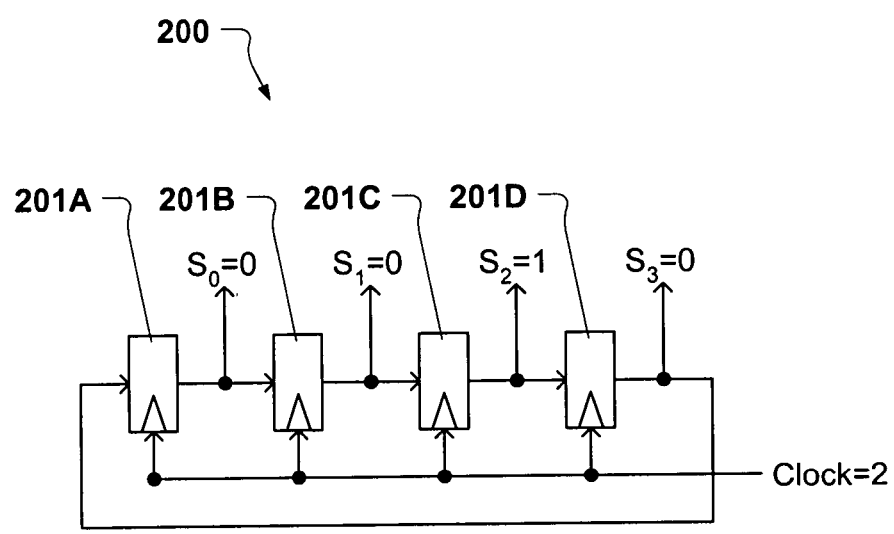
FIG. 6A is an illustration showing the rotating selector at a clock cycle 2, in accordance with one embodiment of the present invention.
Figure 6B:
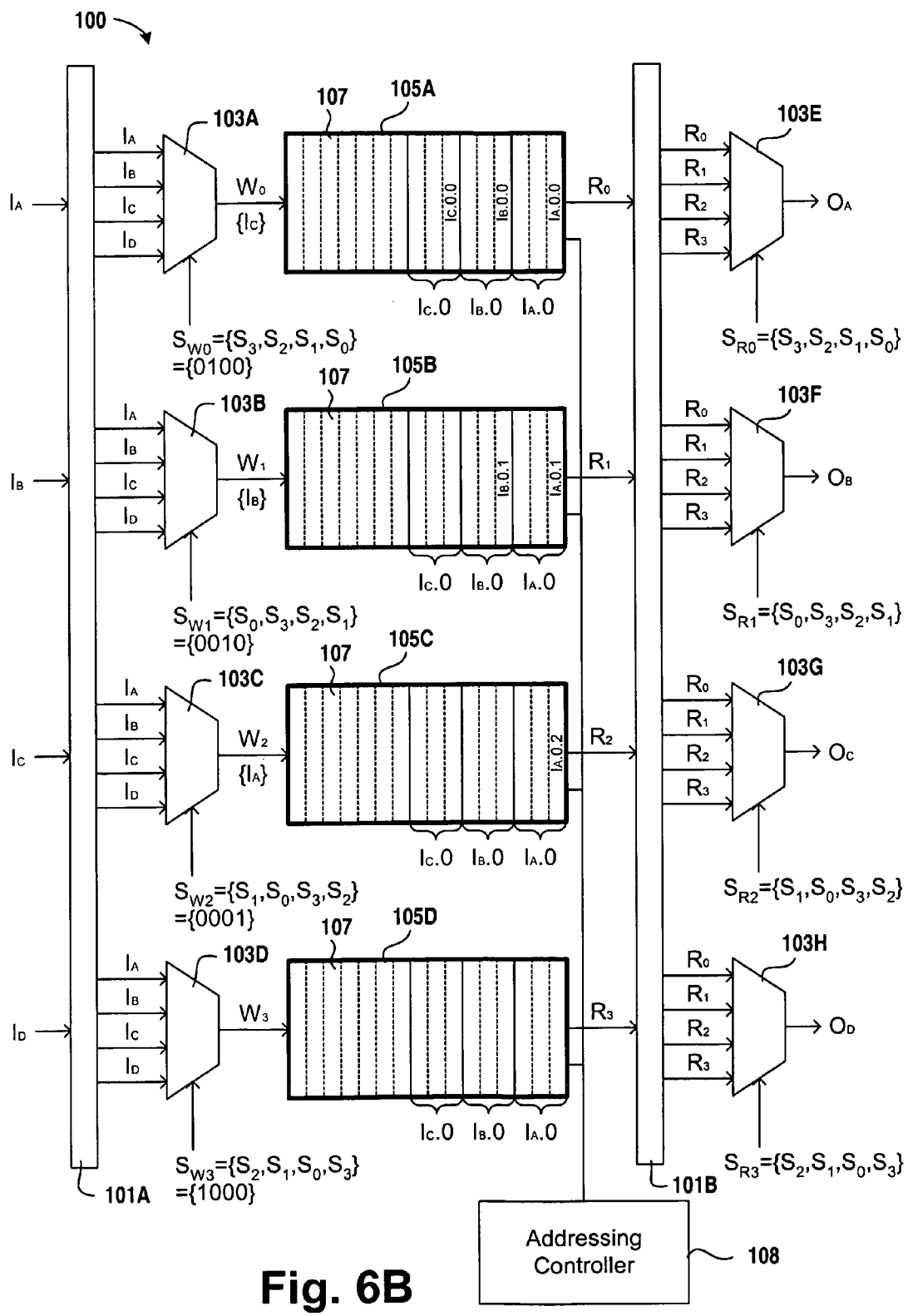
FIG. 6B is an illustration showing the memory at the clock cycle 2, in accordance with one embodiment of the present invention.

FIG. 6A is an illustration showing the rotating selector 200 at a clock cycle 2, in accordance with one embodiment of the present invention. FIG. 6B is an illustration showing the memory 100 at the clock cycle 2, in accordance with one embodiment of the present invention. At the clock cycle 2, $S_{W0}$ is {0100}. Therefore, at the clock cycle 2, MUX 103A transmits a portion of the input $I_C$ data stream through output $W_0$ to buffer 105A. Also, at or before the clock cycle 2 the addressing controller 108 establishes a data block across buffers 105A–105D for storage of the input $I_C$ data stream. For illustrative purposes, the data block established for the input $I_C$ data stream is identified by bracketed regions labeled $I_C.0$ at each buffer 105A–105D. The label $I_C.0$ refers to input $I_C$ and data stream 0. In the current example, three data storage locations 107 are allocated within each buffer 105A–105D for storage of the input $I_C$ data stream. The portion of the input $I_C$ data stream stored in buffer 105A at the clock cycle 2 is indicated by $I_C.0.0$, wherein the input identifier is $I_C$, the data stream identifier is 0, and the portion identifier is 0.

Also, at the clock cycle 2, the selector signal $S_{W1}$ is {0010} which instructs MUX 103B to transmit a next portion of the input $I_B$ data stream through output $W_1$ to buffer 105B. The addressing controller 108 directs the buffer 105B to store the next portion of the input $I_B$ data stream at the next available data storage location 107 allocated for $I_B.0$ in the buffer 105B. The next portion of the input $I_B$ data stream stored in buffer 105B at the clock cycle 2 is indicated by $I_B.0.1$, wherein the portion identifier is 1.

Also, at the clock cycle 2, the selector signal $S_{W2}$ is {0001} which instructs MUX 103C to transmit a next portion of the input $I_A$ data stream through output $W_2$ to buffer 105C. The addressing controller 108 directs the buffer 105C to store the next portion of the input $I_A$ data stream at the next available data storage location 107 allocated for $I_A.0$ in the buffer 105C. The next portion of the input $I_A$ data stream stored in buffer 105C at the clock cycle 2 is indicated by $I_A.0.2$, wherein the portion identifier is 2.

Figure 7A:
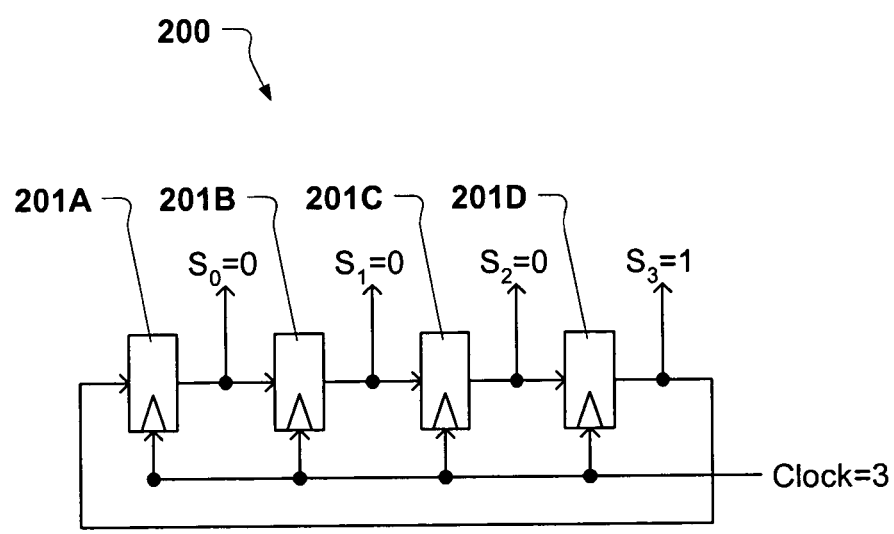
FIG. 7A is an illustration showing the rotating selector at a clock cycle 3, in accordance with one embodiment of the present invention.
Figure 7B:
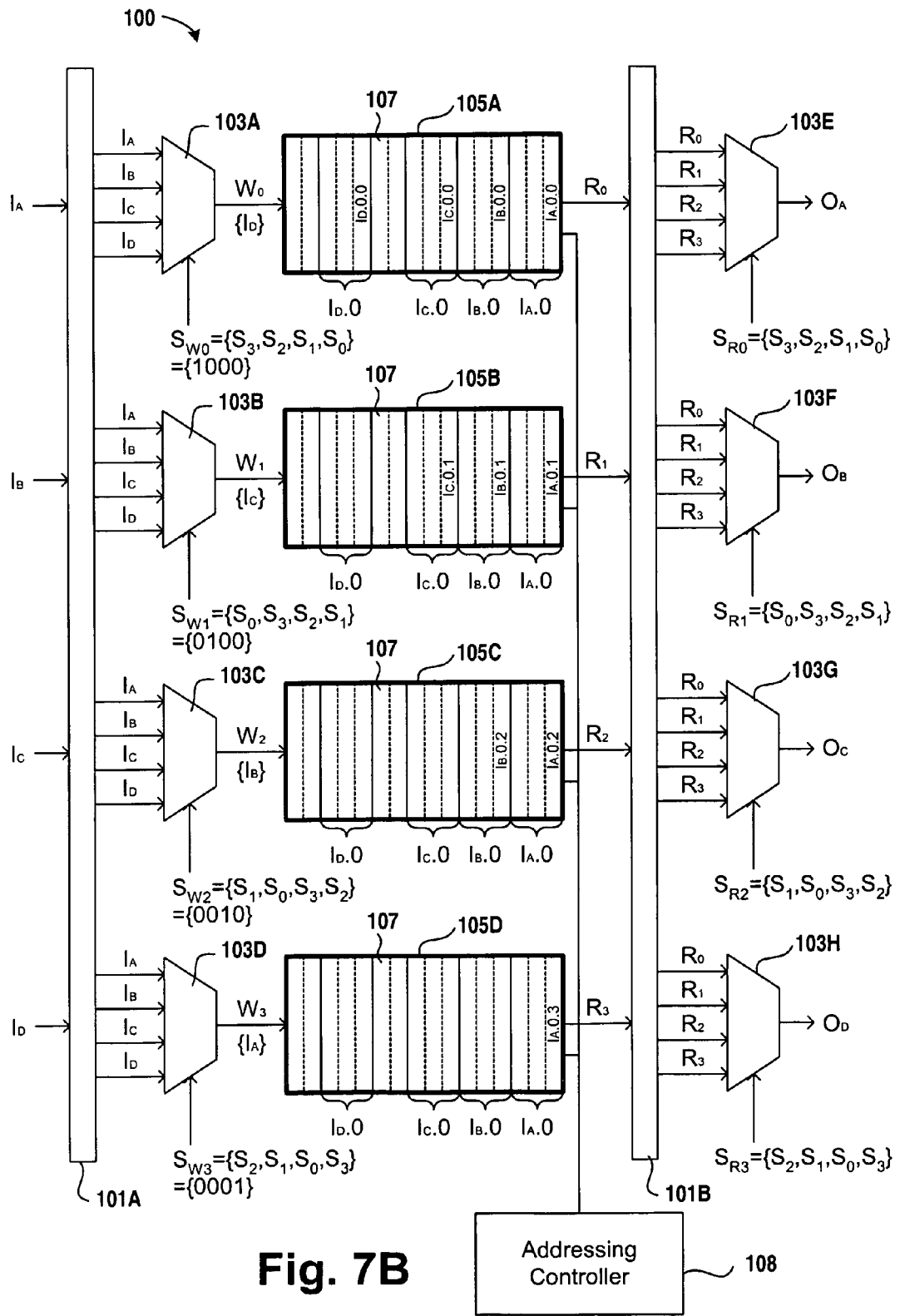
FIG. 7B is an illustration showing the memory at the clock cycle 3, in accordance with one embodiment of the present invention.

FIG. 7A is an illustration showing the rotating selector 200 at a clock cycle 3, in accordance with one embodiment of the present invention. FIG. 7B is an illustration showing the memory 100 at the clock cycle 3, in accordance with one embodiment of the present invention. At the clock cycle 3, $S_{W0}$ is {1000}. Therefore, at the clock cycle 3, MUX 103A transmits a portion of the input $I_D$ data stream through output $W_0$ to buffer 105A. Also, at or before the clock cycle 3 the addressing controller 108 establishes a data block across buffers 105A–105D for storage of the input $I_D$ data stream. For illustrative purposes, the data block established for the input $I_D$ data stream is identified by bracketed regions labeled $I_D.0$ at each buffer 105A–105D. The label $I_D.0$ refers to input $I_D$ and data stream 0. Notice that the data block established for the input $I_D$ data stream is not immediately adjacent to the data block established for the input $I_C$ data stream. The addressing controller 108 can establish a data block for an incoming data stream at any available location in memory. In one embodiment, the addressing controller 108 is operated to establish data blocks for incoming data streams in a manner that will most efficiently utilize the available memory. In the current example, three data storage locations 107 are allocated within each buffer 105A–105D for storage of the input $I_D$ data stream. The portion of the input $I_D$ data stream stored in buffer 105A at the clock cycle 3 is indicated by $I_D.0.0$, wherein the input identifier is $I_D$, the data stream identifier is 0, and the portion identifier is 0.

Also, at the clock cycle 3, the selector signal $S_{W1}$ is {0100} which instructs MUX 103B to transmit a next portion of the input $I_C$ data stream through output $W_1$ to buffer 105B. The addressing controller 108 directs the buffer 105B to store the next portion of the input $I_C$ data stream at the next available data storage location 107 allocated for $I_C.0$ in the buffer 105B. The next portion of the input $I_C$ data stream stored in buffer 105B at the clock cycle 3 is indicated by $I_C.0.1$, wherein the portion identifier is 1.

Also, at the clock cycle 3, the selector signal $S_{W2}$ is {0010} which instructs MUX 103C to transmit a next portion of the input $I_B$ data stream through output $W_2$ to buffer 105C. The addressing controller 108 directs the buffer 105C to store the next portion of the input $I_B$ data stream at the next available data storage location 107 allocated for $I_B.0$ in the buffer 105C. The next portion of the input $I_B$ data stream stored in buffer 105C at the clock cycle 3 is indicated by $I_B.0.2$, wherein the portion identifier is 2.

Also, at the clock cycle 3, the selector signal $S_{W3}$ is {0001} which instructs MUX 103D to transmit a next portion of the input $I_A$ data stream through output $W_3$ to buffer 105D. The addressing controller 108 directs the buffer 105D to store the next portion of the input $I_A$ data stream at the next available data storage location 107 allocated for $I_A.0$ in the buffer 105D. The next portion of the input $I_A$ data stream stored in buffer 105D at the clock cycle 3 is indicated by $I_A.0.3$, wherein the portion identifier is 3.

Figure 8A:
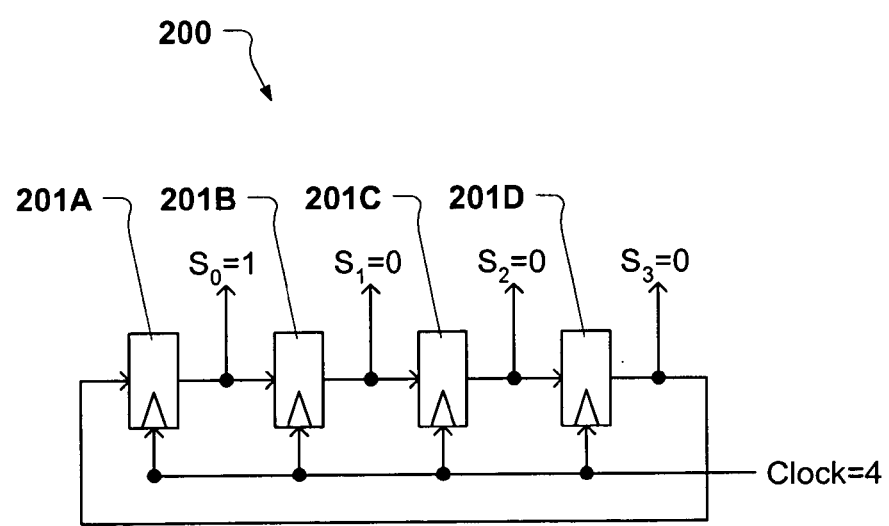
FIG. 8A is an illustration showing the rotating selector at a clock cycle 4, in accordance with one embodiment of the present invention.
Figure 8B:
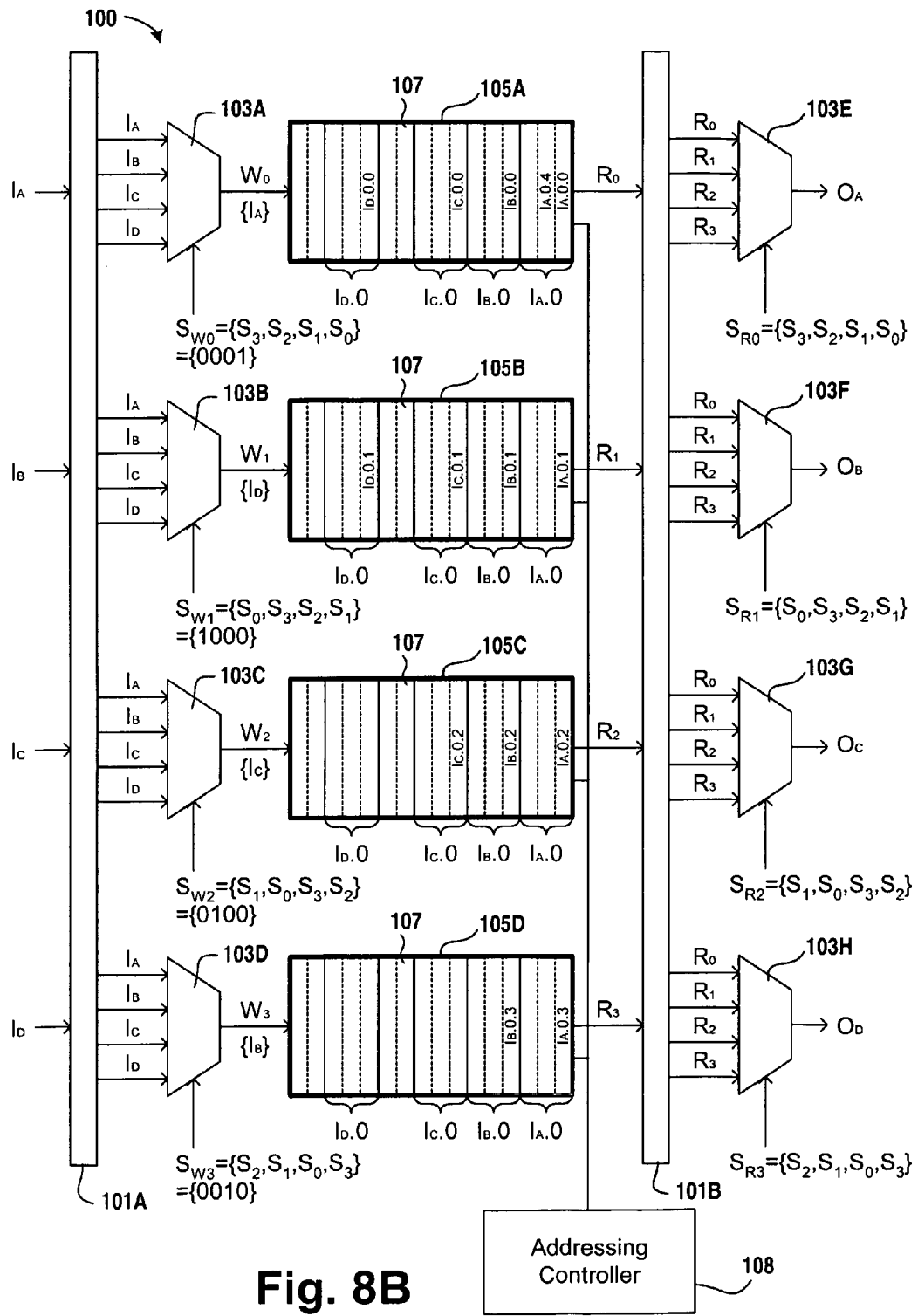
FIG. 8B is an illustration showing the memory at the clock cycle 4, in accordance with one embodiment of the present invention.

FIG. 8A is an illustration showing the rotating selector 200 at a clock cycle 4, in accordance with one embodiment of the present invention. FIG. 8B is an illustration showing the memory 100 at the clock cycle 4, in accordance with one embodiment of the present invention. At the clock cycle 4, the selector signal $S_{W0}$ is {0001} which instructs MUX 103A to transmit a next portion of the input $I_A$ data stream through output $W_0$ to buffer 105A. The addressing controller 108 directs the buffer 105A to store the next portion of the input $I_A$ data stream at the next available data storage location 107 allocated for $I_A.0$ in the buffer 105A. The next portion of the input $I_A$ data stream stored in buffer 105A at the clock cycle 4 is indicated by $I_A.0.4$, wherein the portion identifier is 4.

Also, at the clock cycle 4, the selector signal $S_{W1}$ is {1000} which instructs MUX 103B to transmit a next portion of the input $I_D$ data stream through output $W_1$ to buffer 105B. The addressing controller 108 directs the buffer 105B to store the next portion of the input $I_D$ data stream at the next available data storage location 107 allocated for $I_D.0$ in the buffer 105B. The next portion of the input $I_D$ data stream stored in buffer 105B at the clock cycle 4 is indicated by $I_D.0.1$, wherein the portion identifier is 1.

Also, at the clock cycle 4, the selector signal $S_{W2}$ is {0100} which instructs MUX 103C to transmit a next portion of the input $I_C$ data stream through output $W_2$ to buffer 105C. The addressing controller 108 directs the buffer 105C to store the next portion of the input $I_C$ data stream at the next available data storage location 107 allocated for $I_C.0$ in the buffer 105C. The next portion of the input $I_C$ data stream stored in buffer 105C at the clock cycle 4 is indicated by $I_C.0.2$, wherein the portion identifier is 2.

Also, at the clock cycle 4, the selector signal $S_{W3}$ is {0010} which instructs MUX 103D to transmit a next portion of the input $I_B$ data stream through output $W_3$ to buffer 105D. The addressing controller 108 directs the buffer 105D to store the next portion of the input $I_B$ data stream at the next available data storage location 107 allocated for $I_B.0$ in the buffer 105D. The next portion of the input $I_B$ data stream stored in buffer 105D at the clock cycle 4 is indicated by $I_B.0.3$, wherein the portion identifier is 3.

Figure 9A:
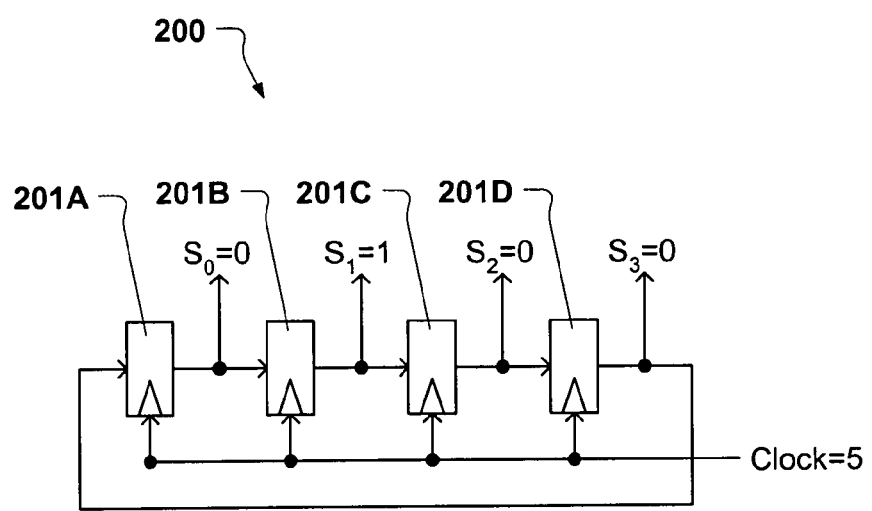
FIG. 9A is an illustration showing the rotating selector at a clock cycle 5, in accordance with one embodiment of the present invention.
Figure 9B:
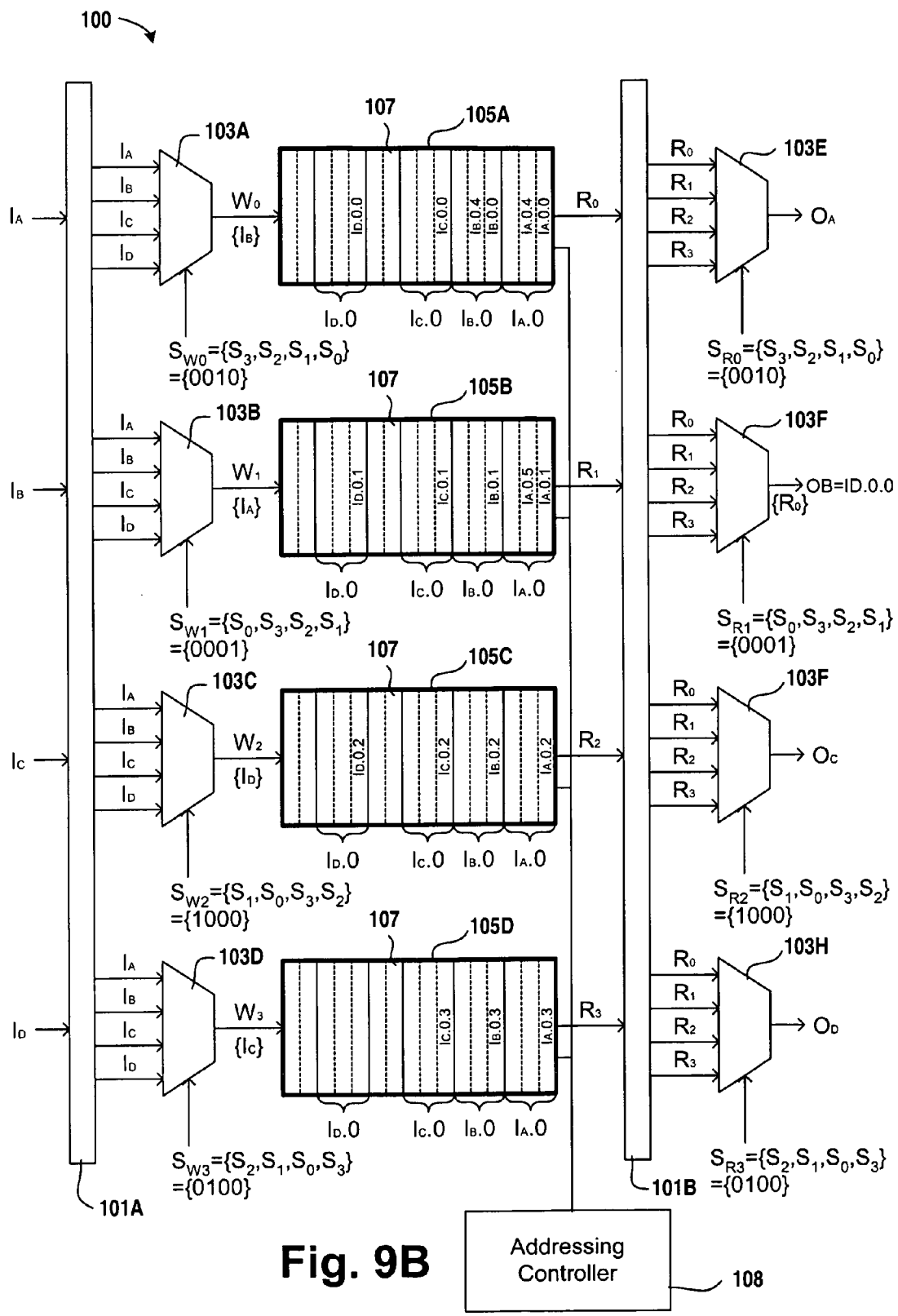
FIG. 9B is an illustration showing the memory at the clock cycle 5, in accordance with one embodiment of the present invention.

FIG. 9A is an illustration showing the rotating selector 200 at a clock cycle 5, in accordance with one embodiment of the present invention. FIG. 9B is an illustration showing the memory 100 at the clock cycle 5, in accordance with one embodiment of the present invention. At the clock cycle 5, the selector signal $S_{W0}$ is {0010} which instructs MUX 103A to transmit a next portion of the input $I_B$ data stream through output $W_0$ to buffer 105A. The addressing controller 108 directs the buffer 105A to store the next portion of the input $I_B$ data stream at the next available data storage location 107 allocated for $I_B.0$ in the buffer 105A. The next portion of the input $I_B$ data stream stored in buffer 105A at the clock cycle 5 is indicated by $I_B.0.4$, wherein the portion identifier is 4.

Also, at the clock cycle 5, the selector signal $S_{W1}$ is {0001} which instructs MUX 103B to transmit a next portion of the input $I_A$ data stream through output $W_1$ to buffer 105B. The addressing controller 108 directs the buffer 105B to store the next portion of the input $I_A$ data stream at the next available data storage location 107 allocated for $I_A.0$ in the buffer 105B. The next portion of the input $I_A$ data stream stored in buffer 105B at the clock cycle 5 is indicated by $I_A.0.5$, wherein the portion identifier is 5.

Also, at the clock cycle 5, the selector signal $S_{W2}$ is {1000} which instructs MUX 103C to transmit a next portion of the input $I_D$ data stream through output $W_2$ to buffer 105C. The addressing controller 108 directs the buffer 105C to store the next portion of the input $I_D$ data stream at the next available data storage location 107 allocated for $I_D.0$ in the buffer 105C. The next portion of the input $I_D$ data stream stored in buffer 105C at the clock cycle 5 is indicated by $I_D.0.2$, wherein the portion identifier is 2.

Also, at the clock cycle 5, the selector signal $S_{W3}$ is {0100} which instructs MUX 103D to transmit a next portion of the input $I_C$ data stream through output $W_3$ to buffer 105D. The addressing controller 108 directs the buffer 105D to store the next portion of the input $I_C$ data stream at the next available data storage location 107 allocated for $I_C.0$ in the buffer 105D. The next portion of the input $I_C$ data stream stored in buffer 105D at the clock cycle 5 is indicated by $I_C.0.3$, wherein the portion identifier is 3.

Continuing with the current example, prior to the clock cycle 5, the memory controller receives requests to provide the stored data streams $I_C.0$, $I_D.0$, $I_A.0$, and $I_B.0$ to outputs $O_A$, $O_B$, $O_C$, and $O_D$, respectively. The memory controller instructs the memory 100 to begin providing the stored data streams to outputs $O_A$, $O_B$, $O_C$, and $O_D$ when $S_{R0}$, $S_{R1}$, $S_{R2}$, and $S_{R3}$, respectively, are {0001}. At the clock cycle 5, $S_{R1}$ is {0001}. Therefore, at the clock cycle 5, MUX 103F transmits the $I_D.0.0$ portion of the input $I_D$ data stream from the buffer 105A output $R_0$ to output $O_B$.

Figure 10A:
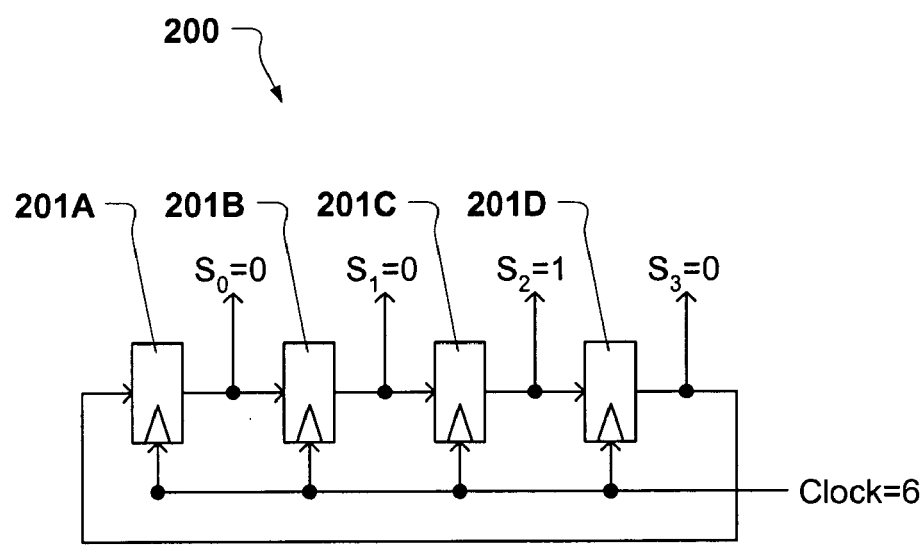
FIG. 10A is an illustration showing the rotating selector at a clock cycle 6, in accordance with one embodiment of the present invention.
Figure 10B:
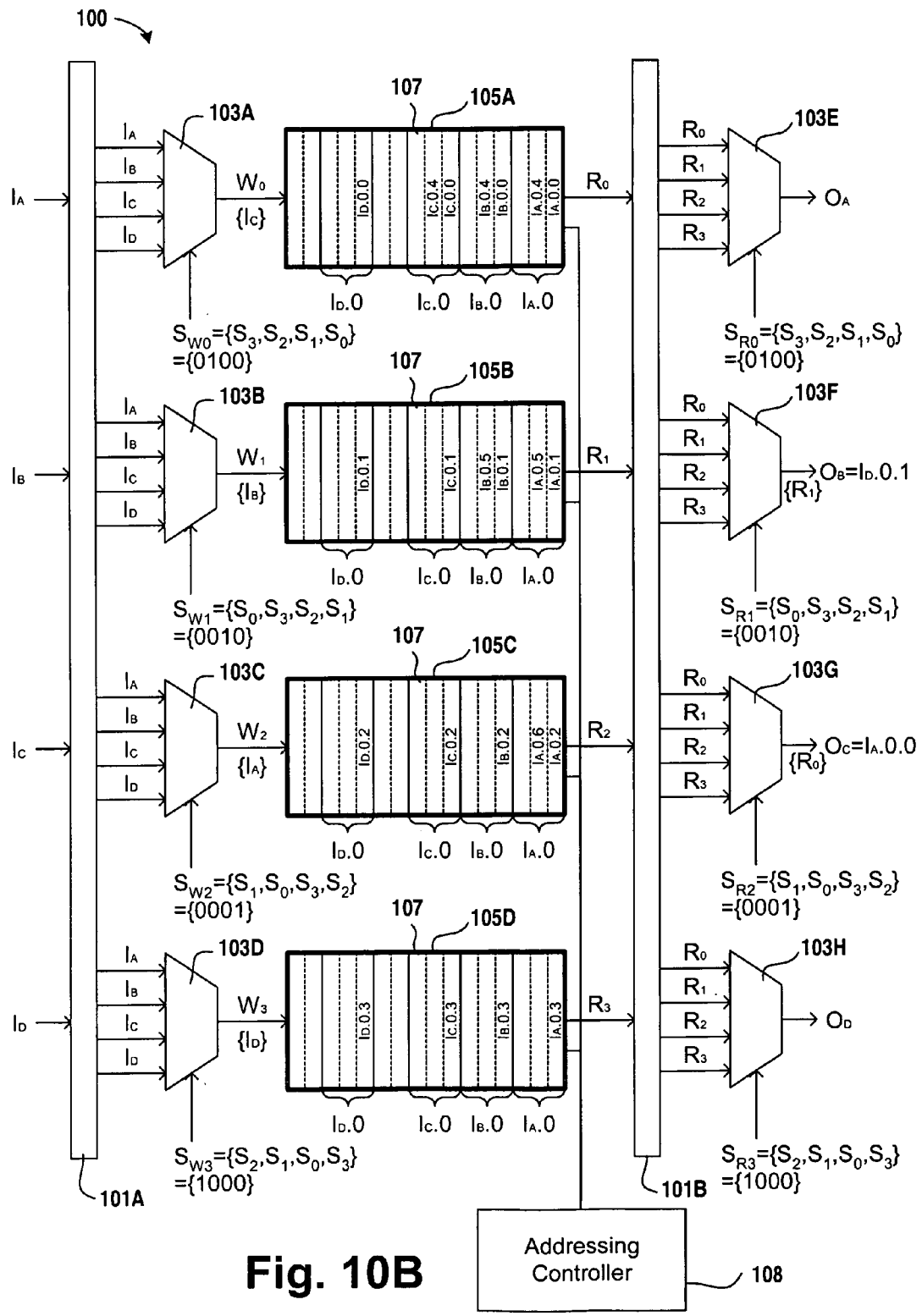
FIG. 10B is an illustration showing the memory at the clock cycle 6, in accordance with one embodiment of the present invention.

FIG. 10A is an illustration showing the rotating selector 200 at a clock cycle 6, in accordance with one embodiment of the present invention. FIG. 10B is an illustration showing the memory 100 at the clock cycle 6, in accordance with one embodiment of the present invention. At the clock cycle 6, the selector signal $S_{W0}$ is {0100} which instructs MUX 103A to transmit a next portion of the input $I_C$ data stream through output $W_0$ to buffer 105A. The addressing controller 108 directs the buffer 105A to store the next portion of the input $I_C$ data stream at the next available data storage location 107 allocated for $I_C.0$ in the buffer 105A. The next portion of the input $I_C$ data stream stored in buffer 105A at the clock cycle 6 is indicated by $I_C.0.4$, wherein the portion identifier is 4.

Also, at the clock cycle 6, the selector signal $S_{W1}$ is {0010} which instructs MUX 103B to transmit a next portion of the input $I_B$ data stream through output $W_1$ to buffer 105B. The addressing controller 108 directs the buffer 105B to store the next portion of the input $I_B$ data stream at the next available data storage location 107 allocated for $I_B.0$ in the buffer 105B. The next portion of the input $I_B$ data stream stored in buffer 105B at the clock cycle 6 is indicated by $I_B.0.5$, wherein the portion identifier is 5.

Also, at the clock cycle 6, the selector signal $S_{W2}$ is {0001} which instructs MUX 103C to transmit a next portion of the input $I_A$ data stream through output $W_2$ to buffer 105C. The addressing controller 108 directs the buffer 105C to store the next portion of the input $I_A$ data stream at the next available data storage location 107 allocated for $I_A.0$ in the buffer 105C. The next portion of the input $I_A$ data stream stored in buffer 105C at the clock cycle 6 is indicated by $I_A.0.6$, wherein the portion identifier is 6.

Also, at the clock cycle 6, the selector signal $S_{W3}$ is {1000} which instructs MUX 103D to transmit a next portion of the input $I_D$ data stream through output $W_3$ to buffer 105D. The addressing controller 108 directs the buffer 105D to store the next portion of the input $I_D$ data stream at the next available data storage location 107 allocated for $I_D.0$ in the buffer 105D. The next portion of the input $I_D$ data stream stored in buffer 105D at the clock cycle 6 is indicated by $I_D.0.3$, wherein the portion identifier is 3.

Also, at the clock cycle 6, $S_{R2}$ is {0001}. Therefore, at the clock cycle 6, MUX 103G transmits the $I_A.0.0$ portion of the input $I_A$ data stream from the buffer 105A output $R_0$ to output $O_C$.

Also, at the clock cycle 6, $S_{R1}$ is {0010}. Therefore, at the clock cycle 6, MUX 103G transmits the $I_D.0.1$ portion of the input $I_D$ data stream from the buffer 105B output $R_1$ to output $O_B$.

Figure 11A:
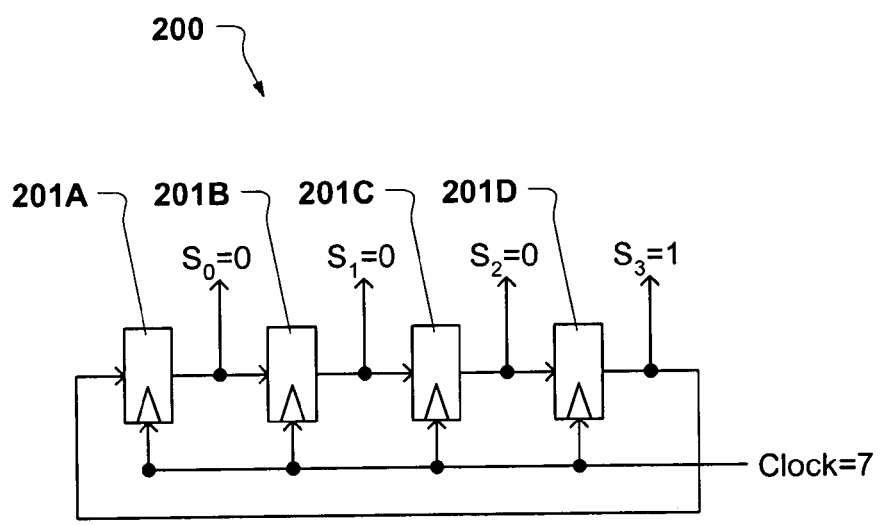
FIG. 11A is an illustration showing the rotating selector at a clock cycle 7, in accordance with one embodiment of the present invention.
Figure 11B:
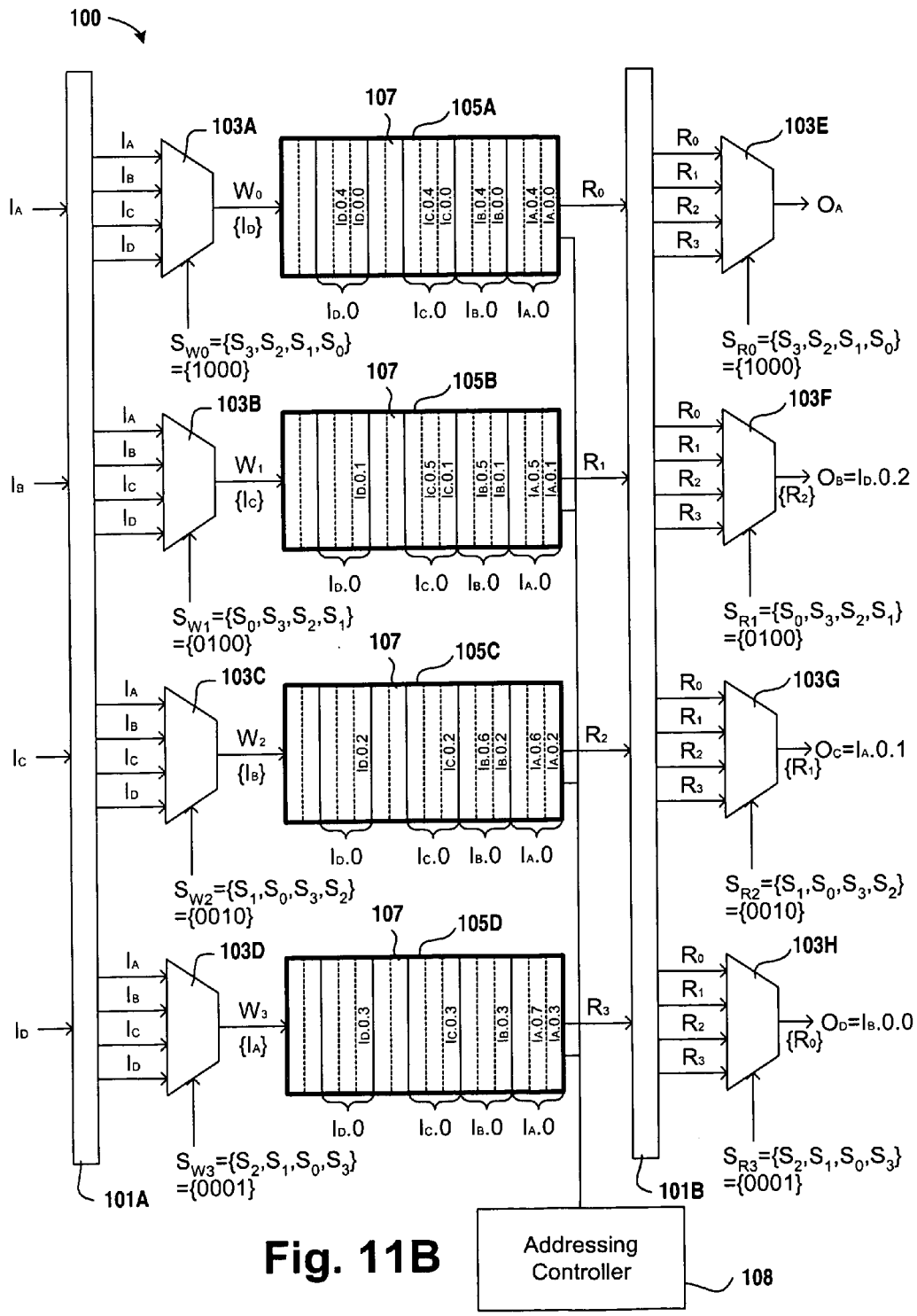
FIG. 11B is an illustration showing the memory at the clock cycle 7, in accordance with one embodiment of the present invention.

FIG. 11A is an illustration showing the rotating selector 200 at a clock cycle 7, in accordance with one embodiment of the present invention. FIG. 11B is an illustration showing the memory 100 at the clock cycle 7, in accordance with one embodiment of the present invention. At the clock cycle 7, the selector signal $S_{W0}$ is {1000} which instructs MUX 103A to transmit a next portion of the input $I_D$ data stream through output $W_0$ to buffer 105A. The addressing controller 108 directs the buffer 105A to store the next portion of the input $I_D$ data stream at the next available data storage location 107 allocated for $I_D.0$ in the buffer 105A. The next portion of the input $I_D$ data stream stored in buffer 105A at the clock cycle 7 is indicated by $I_D.0.4$, wherein the portion identifier is 4.

Also, at the clock cycle 7, the selector signal $S_{W1}$ is {0100} which instructs MUX 103B to transmit a next portion of the input $I_C$ data stream through output $W_1$ to buffer 105B. The addressing controller 108 directs the buffer 105B to store the next portion of the input $I_C$ data stream at the next available data storage location 107 allocated for $I_C.0$ in the buffer 105B. The next portion of the input $I_C$ data stream stored in buffer 105B at the clock cycle 7 is indicated by $I_C.0.5$, wherein the portion identifier is 5.

Also, at the clock cycle 7, the selector signal $S_{W2}$ is {0010} which instructs MUX 103C to transmit a next portion of the input $I_B$ data stream through output $W_2$ to buffer 105C. The addressing controller 108 directs the buffer 105C to store the next portion of the input $I_B$ data stream at the next available data storage location 107 allocated for $I_B.0$ in the buffer 105C. The next portion of the input $I_B$ data stream stored in buffer 105C at the clock cycle 7 is indicated by $I_B.0.6$, wherein the portion identifier is 6.

Also, at the clock cycle 7, the selector signal $S_{W3}$ is {0001} which instructs MUX 103D to transmit a next portion of the input $I_A$ data stream through output $W_3$ to buffer 105D. The addressing controller 108 directs the buffer 105D to store the next portion of the input $I_A$ data stream at the next available data storage location 107 allocated for $I_A.0$ in the buffer 105D. The next portion of the input $I_A$ data stream stored in buffer 105D at the clock cycle 7 is indicated by $I_A.0.7$, wherein the portion identifier is 7.

Also, at the clock cycle 7, $S_{R3}$ is {0001}. Therefore, at the clock cycle 7, MUX 103H transmits the $I_B.0.0$ portion of the input $I_B$ data stream from the buffer 105A output $R_0$ to output $O_D$.

Also, at the clock cycle 7, $S_{R2}$ is {0010}. Therefore, at the clock cycle 7, MUX 103G transmits the $I_A.0.1$ portion of the input $I_A$ data stream from the buffer 105B output $R_1$ to output $O_C$.

Also, at the clock cycle 7, $S_{R1}$ is {0100}. Therefore, at the clock cycle 7, MUX 103F transmits the $I_D.0.2$ portion of the input $I_D$ data stream from the buffer 105C output $R_2$ to output $O_B$.

Figure 12A:
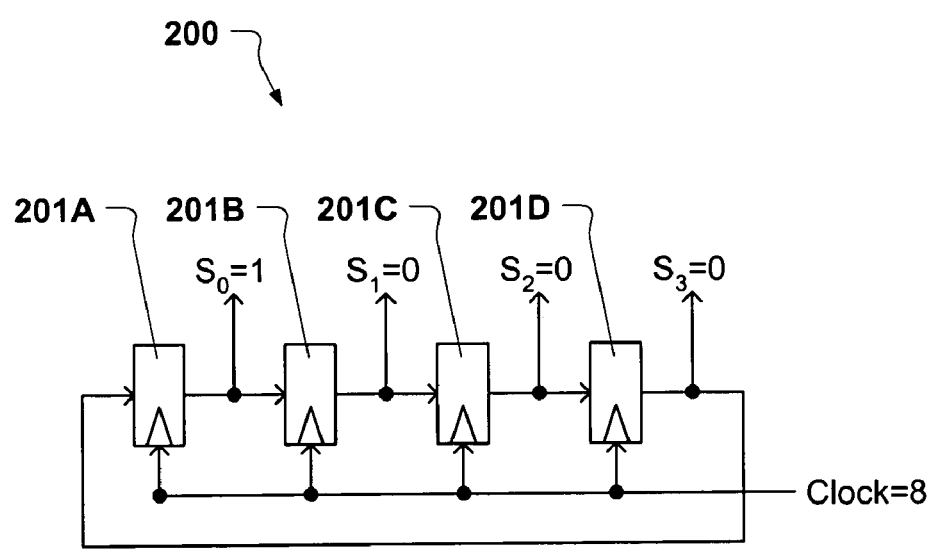
FIG. 12A is an illustration showing the rotating selector at a clock cycle 8, in accordance with one embodiment of the present invention.
Figure 12B:
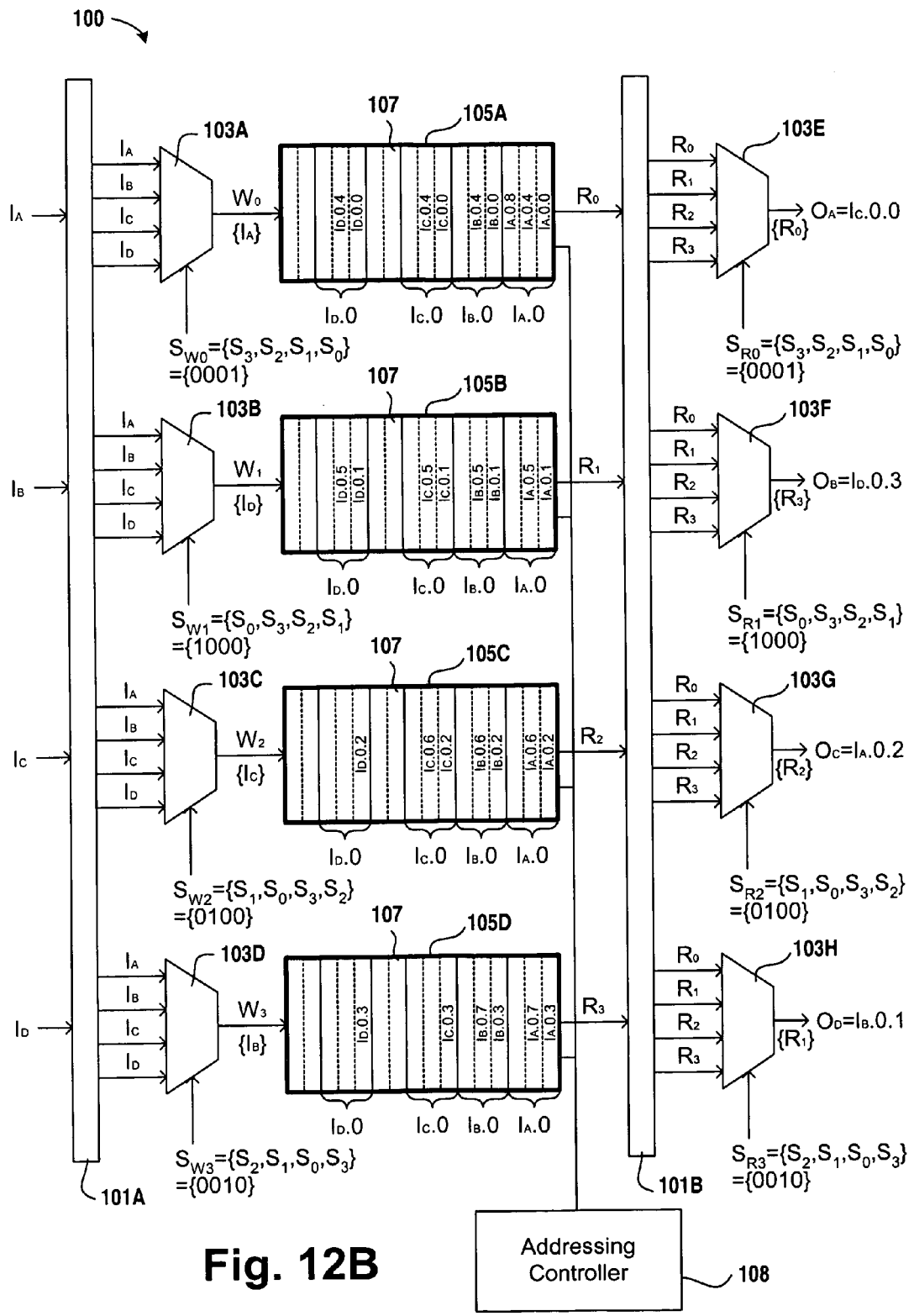
FIG. 12B is an illustration showing the memory at the clock cycle 8, in accordance with one embodiment of the present invention.

FIG. 12A is an illustration showing the rotating selector 200 at a clock cycle 8, in accordance with one embodiment of the present invention. FIG. 12B is an illustration showing the memory 100 at the clock cycle 8, in accordance with one embodiment of the present invention. At the clock cycle 8, the selector signal $S_{W0}$ is {0001} which instructs MUX 103A to transmit a next portion of the input $I_A$ data stream through output $W_0$ to buffer 105A. The addressing controller 108 directs the buffer 105A to store the next portion of the input $I_A$ data stream at the next available data storage location 107 allocated for $I_A.0$ in the buffer 105A. The next portion of the input $I_A$ data stream stored in buffer 105A at the clock cycle 8 is indicated by $I_A.0.8$, wherein the portion identifier is 8.

Also, at the clock cycle 8, the selector signal $S_{W1}$ is {1000} which instructs MUX 103B to transmit a next portion of the input $I_D$ data stream through output $W_1$ to buffer 105B. The addressing controller 108 directs the buffer 105B to store the next portion of the input $I_D$ data stream at the next available data storage location 107 allocated for $I_D.0$ in the buffer 105B. The next portion of the input $I_D$ data stream stored in buffer 105B at the clock cycle 8 is indicated by $I_D.0.5$, wherein the portion identifier is 5.

Also, at the clock cycle 8, the selector signal $S_{W2}$ is {0100} which instructs MUX 103C to transmit a next portion of the input $I_C$ data stream through output $W_2$ to buffer 105C. The addressing controller 108 directs the buffer 105C to store the next portion of the input $I_C$ data stream at the next available data storage location 107 allocated for $I_C.0$ in the buffer 105C. The next portion of the input $I_C$ data stream stored in buffer 105C at the clock cycle 8 is indicated by $I_C.0.6$, wherein the portion identifier is 6.

Also, at the clock cycle 8, the selector signal $S_{W3}$ is {0010} which instructs MUX 103D to transmit a next portion of the input $I_B$ data stream through output $W_3$ to buffer 105D. The addressing controller 108 directs the buffer 105D to store the next portion of the input $I_B$ data stream at the next available data storage location 107 allocated for $I_B.0$ in the buffer 105D. The next portion of the input $I_B$ data stream stored in buffer 105D at the clock cycle 8 is indicated by $I_B.0.7$, wherein the portion identifier is 7.

Also, at the clock cycle 8, $S_{R0}$ is {0001}. Therefore, at the clock cycle 8, MUX 103E transmits the $I_C.0.0$ portion of the input $I_C$ data stream from the buffer 105A output $R_0$ to output $O_A$.

Also, at the clock cycle 8, $S_{R3}$ is {0010}. Therefore, at the clock cycle 8, MUX 103H transmits the $I_B.0.1$ portion of the input $I_B$ data stream from the buffer 105B output $R_1$ to output $O_D$.

Also, at the clock cycle 8, $S_{R2}$ is {0100}. Therefore, at the clock cycle 8, MUX 103G transmits the $I_A.0.2$ portion of the input $I_A$ data stream from the buffer 105C output $R_2$ to output $O_C$.

Also, at the clock cycle 8, $S_{R1}$ is {1000}. Therefore, at the clock cycle 8, MUX 103F transmits the $I_D.0.3$ portion of the input $I_D$ data stream from the buffer 105D output $R_3$ to output $O_B$.

Figure 13A:
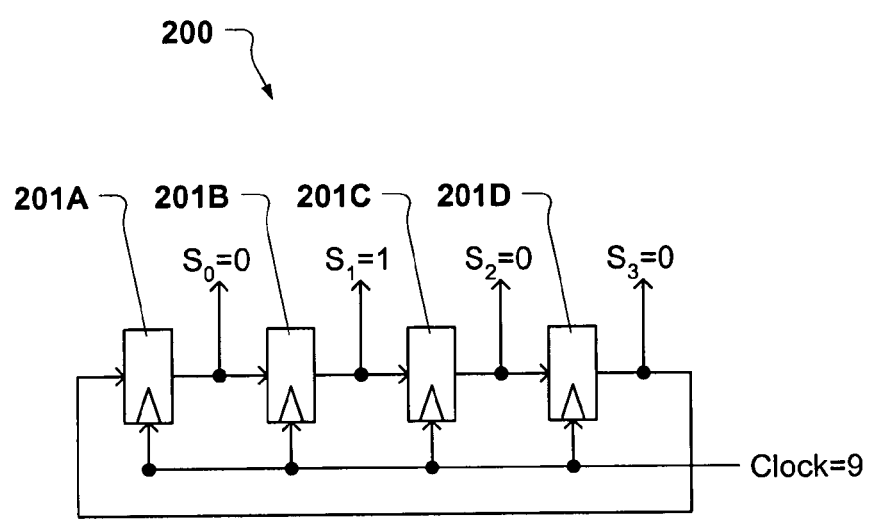
FIG. 13A is an illustration showing the rotating selector at a clock cycle 9, in accordance with one embodiment of the present invention.
Figure 13B:
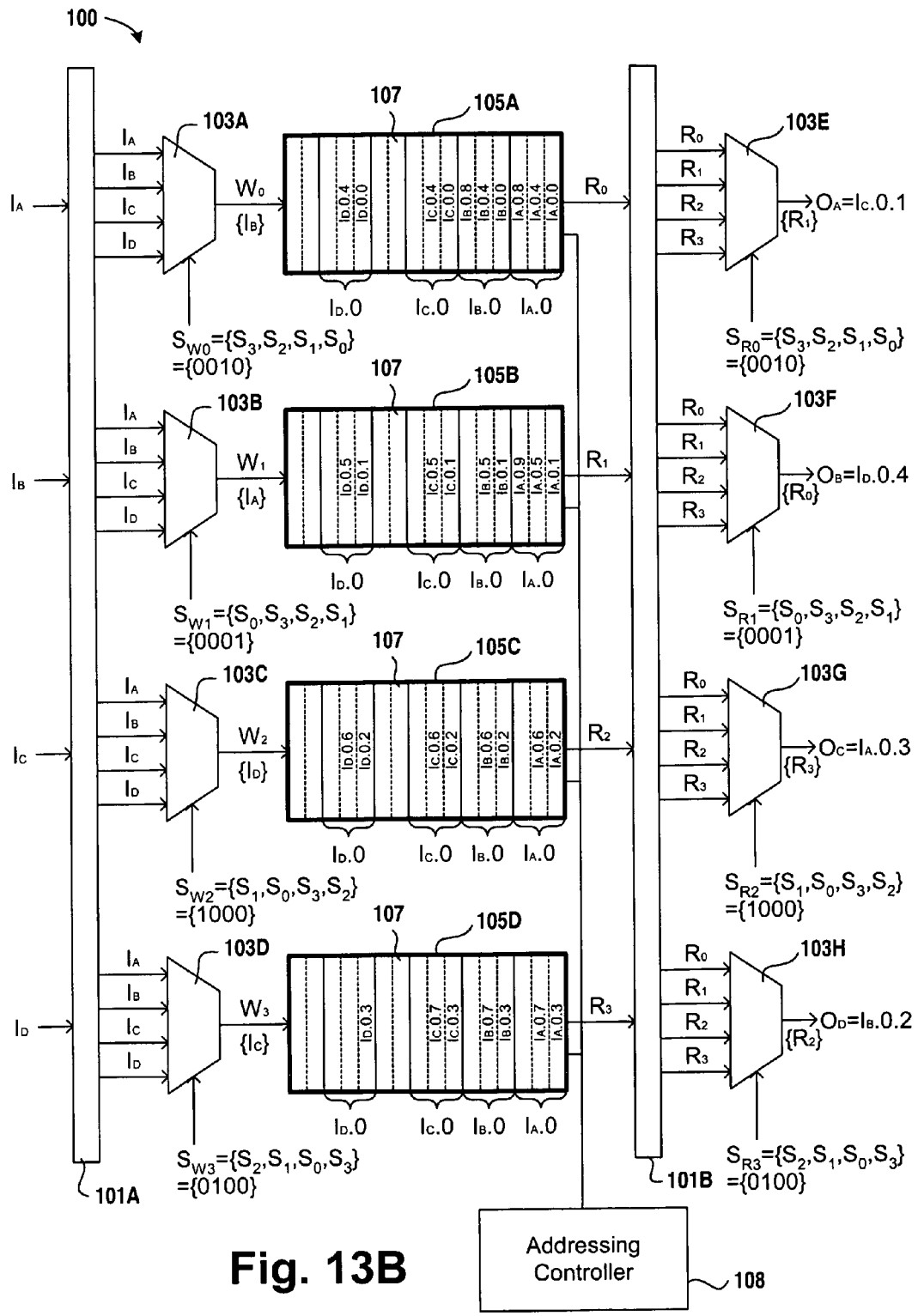
FIG. 13B is an illustration showing the memory at the clock cycle 9, in accordance with one embodiment of the present invention.

FIG. 13A is an illustration showing the rotating selector 200 at a clock cycle 9, in accordance with one embodiment of the present invention. FIG. 13B is an illustration showing the memory 100 at the clock cycle 9, in accordance with one embodiment of the present invention. At the clock cycle 9, the selector signal $S_{W0}$ is {0010} which instructs MUX 103A to transmit a next portion of the input $I_B$ data stream through output $W_0$ to buffer 105A. The addressing controller 108 directs the buffer 105A to store the next portion of the input $I_B$ data stream at the next available data storage location 107 allocated for $I_B.0$ in the buffer 105A. The next portion of the input $I_B$ data stream stored in buffer 105A at the clock cycle 9 is indicated by $I_B.0.8$, wherein the portion identifier is 8.

Also, at the clock cycle 9, the selector signal $S_{W1}$ is {0001} which instructs MUX 103B to transmit a next portion of the input $I_A$ data stream through output $W_1$ to buffer 105B. The addressing controller 108 directs the buffer 105B to store the next portion of the input $I_A$ data stream at the next available data storage location 107 allocated for $I_A.0$ in the buffer 105B. The next portion of the input $I_A$ data stream stored in buffer 105B at the clock cycle 9 is indicated by $I_A.0.9$, wherein the portion identifier is 9.

Also, at the clock cycle 9, the selector signal $S_{W2}$ is {1000} which instructs MUX 103C to transmit a next portion of the input $I_D$ data stream through output $W_2$ to buffer 105C. The addressing controller 108 directs the buffer 105C to store the next portion of the input $I_D$ data stream at the next available data storage location 107 allocated for $I_D.0$ in the buffer 105C. The next portion of the input $I_D$ data stream stored in buffer 105C at the clock cycle 9 is indicated by $I_D.0.6$, wherein the portion identifier is 6.

Also, at the clock cycle 9, the selector signal $S_{W3}$ is {0100} which instructs MUX 103D to transmit a next portion of the input $I_C$ data stream through output $W_3$ to buffer 105D. The addressing controller 108 directs the buffer 105D to store the next portion of the input $I_C$ data stream at the next available data storage location 107 allocated for $I_C.0$ in the buffer 105D. The next portion of the input $I_C$ data stream stored in buffer 105D at the clock cycle 9 is indicated by $I_C.0.7$, wherein the portion identifier is 7.

Also, at the clock cycle 9, $S_{R0}$ is {0010}. Therefore, at the clock cycle 9, MUX 103E transmits the $I_C.0.1$ portion of the input $I_C$ data stream from the buffer 105B output $R_1$ to output $O_A$.

Also, at the clock cycle 9, $S_{R3}$ is {0100}. Therefore, at the clock cycle 9, MUX 103H transmits the $I_B.0.2$ portion of the input $I_B$ data stream from the buffer 105C output $R_2$ to output $O_D$.

Also, at the clock cycle 9, $S_{R2}$ is {1000}. Therefore, at the clock cycle 9, MUX 103G transmits the $I_A.0.3$ portion of the input $I_A$ data stream from the buffer 105D output $R_3$ to output $O_C$.

Also, at the clock cycle 9, $S_{R1}$ is {0001}. Therefore, at the clock cycle 9, MUX 103F transmits the $I_D.0.4$ portion of the input $I_D$ data stream from the buffer 105A output $R_0$ to output $O_B$.

In this example $S_{R0}$–$S_{R3}$ are composed of the same signals that make up $S_{W0}$–$S_{W3}$. However, they may also be generated by a distinct rotating selector.

As demonstrated by the example memory 100 and rotating selector 200 operation shown in FIGS. 4A–13B, when a data stream is deposited in the memory 100, the data stream is interleaved over a number of memory banks included in the memory 100. Each of the number of memory banks is independently addressable. In one embodiment, each of the number of memory banks is also dual ported to be written to and read from simultaneously. However, in other embodiments, memory banks that are not dual ported can also be used. The memory 100 is capable of simultaneously receiving a number of incoming data stream transmissions and providing a number of outgoing data stream transmissions. Each of the incoming and outgoing data stream transmissions can be independently started and stopped by a memory controller. In one embodiment, once an incoming or outgoing data stream transmission is started, the data stream transmission tends to continue for a while before an idle period is encountered. The tendency of the data stream transmission to continue is not a necessary condition of the present invention, but is a characteristic of switch traffic that can be exploited by the present invention for better performance.

As previously discussed, the memory controller instructs the memory 100 to begin storing data streams incoming at inputs $I_A$, $I_B$, $I_C$, and $I_D$ when $S_{W0}$ is {0001}, {0010}, {0100}, and {1000}, respectively. If storage of the incoming data streams cannot be started or stopped immediately (i.e., if a latency exists from the time a start or stop instruction is issued by the memory controller to the time the incoming data stream actually starts or stops), an elasticity buffer can be added before each of the inputs $I_A$, $I_B$, $I_C$, and $I_D$. The elasticity buffer can be used to absorb data that continues to arrive after a stop instruction is issued by the memory controller, and to buffer up data that arrives prior to execution of a start instruction issued by the memory controller. In the example memory 100, each of the inputs $I_A$, $I_B$, $I_C$, and $I_D$ will have to wait at most four clock cycles before execution of a start instruction issued by the memory controller. Therefore, the elasticity buffer should be large enough to handle an amount of data that can arrive in an incoming data stream over four clock cycles.

Since each memory bank is assigned to a different input and output in every clock cycle, the addressing controller 108 changes the write and read addresses for each memory bank in every clock cycle to point to the appropriate data storage location. In one embodiment, management of the addresses for each memory bank by the addressing controller 108 can be performed using a time slicing device similar to that described in the patent application entitled "Time Slicing Device for Shared Resources and Method for Operating the Same," as previously incorporated herein by reference.

The memory 100 as previously described assumes that all of the inputs and all of the outputs have the same bandwidth characteristics. In applications where there exist inputs of differing bandwidth characteristics, a bandwidth matching device similar to that described in the patent application entitled "Bandwidth Matching Device and Method for Operating the Same," as previously incorporated herein by reference, can be used. The bandwidth matching device is capable of transforming the input bandwidths to satisfy a common bandwidth requirement before being sent to the ratcheting distributor. For example, if there are four 1× bandwidth inputs and three 4× bandwidth inputs, the four 1× inputs can be merged into a single 4× stream using the bandwidth matching device. Then, the resulting four 4× streams can be sent to the ratcheting distributor. Alternatively, the three 4× bandwidth inputs can be transformed into twelve 1× streams. Then, the resulting sixteen 1× streams can be sent to the ratcheting distributor.

Figure 14:
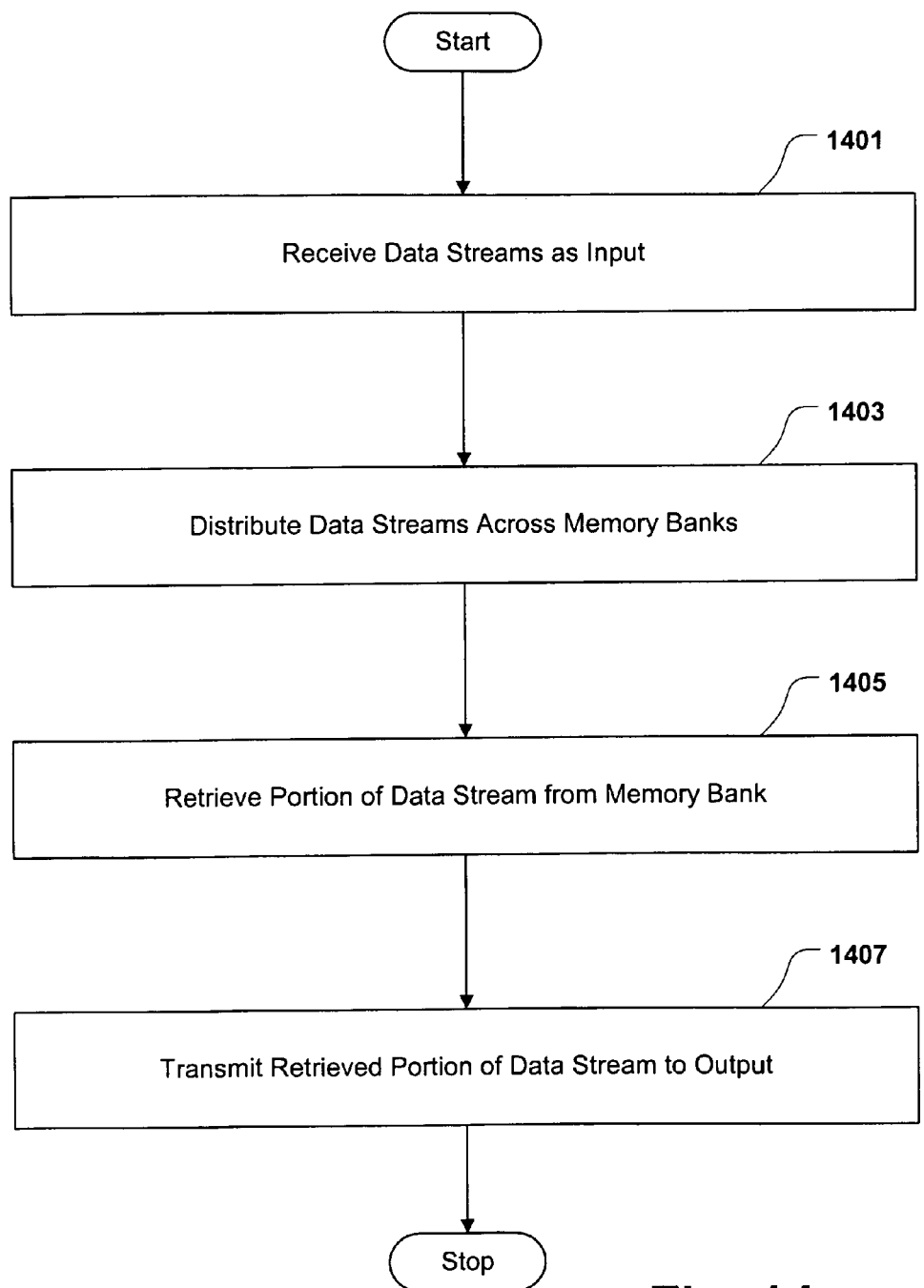
FIG. 14 shows a flowchart illustrating a method for operating a memory, in accordance with one embodiment of the present invention.

FIG. 14 shows a flowchart illustrating a method for operating a memory, in accordance with one embodiment of the present invention. The method includes an operation 1401 in which the memory receives a number of inputs that each represent a data stream to be stored in the memory. The memory is operated with a capability to receive each of the number of inputs simultaneously. The method also includes an operation 1403 in which the data stream associated with each of the number of inputs is distributed across a number of memory banks. A portion of the data stream is stored in each of the number of memory banks as required to completely store the data stream.

A ratcheting distributor can be used to distribute the data stream associated with each of the number of inputs across the number of memory banks. Use of the ratcheting distributor includes operation of a number of multiplexers.

When operated, each of the number of multiplexers receive each of the number of inputs and a selector signal. The selector signal controls which of the number of inputs is transmitted to a multiplexer output that is connected to one of the number of memory banks. Use of the ratcheting distributor further includes generating the selector signal received by each of the number of multiplexers. The generated selector signal is different for each of the number of multiplexers on each cycle of a clock. However, the number of different selector signals is equal to the number of multiplexers. The selector signal received by each of the number of multiplexers is repeated on a clock cycle that is a multiple of the number of inputs.

The method further includes an operation 1405 in which the portion of the data stream stored in each of the number of memory banks is retrieved. In an operation 1407, the retrieved portions of the data stream are transmitted to an output. Transmission of the retrieved portions of the data stream to the output cause the data stream to be provided at the output. The memory is operated with a capability to simultaneously retrieve and transmit portions of different data streams stored in each of the number of memory banks, such that each of the number of data streams are transmitted to different outputs.

A second ratcheting distributor can be used to retrieve and transmit the portion of the data stream stored in each of the number of memory banks. Use of the second ratcheting distributor includes operation of a number of multiplexers. When operated, each of the number of multiplexers receive the portion of the data stream stored in each of the number of memory banks and a selector signal. The selector signal controls which portion of the data stream stored in each of the number of memory banks is transmitted to the output. Use of the ratcheting distributor further includes generating the selector signal received by each of the number of multiplexers. The generated selector signal is different for each of the number of multiplexers on each cycle of a clock. However, the number of different selector signals is equal to the number of multiplexers. The selector signal received by each of the number of multiplexers is repeated on a clock cycle that is a multiple of the number of memory banks.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A switch, comprising:
   a set of inputs;
   a set of memory banks being equal in number to the set of inputs, each input capable of transferring a data stream into the set of memory banks, wherein the data stream of each input is to be distributed across each of the set of memory banks in accordance with a set of single bit control signals;
   a rotating selector for generating the set of single bit control signals, wherein the rotating selector causes a different one of the set of single bit control signals to have a unique state in a given clock cycle; and
   a set of outputs, the set of outputs being equal in number to the set of memory banks, each data stream that is distributed across each of the set of memory banks is to be output from at least one of the set of outputs.

2. A switch as recited in claim 1, wherein the data stream of each input is to be distributed across each of the set of memory banks such that each of the set of memory banks receives one or more differing portions of the data stream.

3. A switch as recited in claim 2, wherein the data stream that is distributed across each of the set of memory banks is to be output from at least one of the set of outputs by retrieving the one or more differing portions of the data stream and transmitting the one or more differing portions of the data stream to the at least one of the set of outputs in a sequence that provides the data stream.

4. A switch as recited in claim 1, further comprising:
   a first set of multiplexers, each of the first set of multiplexers connected to receive the set of inputs, each of the first set of multiplexers having a multiplexer output connected to one of the set of memory banks, each of the set of memory banks being connected to one of the first set of multiplexers, each of the first set of multiplexers connected to receive a selector signal for controlling which of the received set of inputs is to be transmitted to the multiplexer output in a given clock cycle.

5. A switch as recited in claim 4, wherein the selector signal to be received by each of the first set of multiplexers is defined by a particular sequence of the set of single bit control signals, a number of single bit control signals within the set of single bit control signals being equal in number to the set of inputs.

6. A switch as recited in claim 4, wherein the first set of multiplexers and the selector signal received by each of the first set of multiplexers cause the data stream of each input to be distributed across each of the set of memory banks on successive clock cycles.

7. A switch as recited in claim 1,
   wherein the rotating selector causes one of the single bit control signals to have a first digital state and a remainder of the single bit control signals to have a second digital state in the given clock cycle, the rotating selector causing a different one of the single bit control signals to have the first digital state on successive clock cycles such that the first digital state rotates in a defined sequence among the single bit control signals on successive clock cycles.

8. A switch as recited in claim 1, further comprising:
   a second set of multiplexers, each of the second set of multiplexers connected to receive a multiplexer input from each of the set of memory banks, each of the second set of multiplexers having an output representing one of the set of outputs, each of the second set of multiplexers connected to receive a selector signal for controlling which received multiplexer input from each of the set of memory banks is to be transmitted to the output in a given clock cycle.

9. A switch as recited in claim 8, wherein the selector signal to be received by each of the second set of multiplexers is defined by a sequence of single bit signals being equal in number to the set of memory banks.

10. A switch as recited in claim 9, further comprising:
    a second rotating selector for generating the single bit signals sequenced to define the selector signals for the second set of multiplexers, the second rotating selector causing one of the single bit signals to have a first digital state and a remainder of the single bit signals to have a second digital state in the given clock cycle, the second rotating selector causing a different one of the single bit signals to have the first digital state on successive clock cycles such that the first digital state rotates in a defined sequence among the single bit signals on successive clock cycles.

11. A switch as recited in claim 8, wherein the second set of multiplexers and the selector signal received by each of the second set of multiplexers cause the one or more differing portions of the data stream distributed across each of the set of memory banks to be retrieved and transmitted to the output on successive clock cycles such that the data stream is provided at the output.

12. A memory, comprising:
a number of inputs, each input capable of receiving a data stream to be stored in the memory;
a number of memory banks for storing data streams received by the number of inputs, the number of memory banks being equal to the number of inputs;
a first ratcheting distributor for distributing the data stream received by either of the number of inputs across the number of memory banks in accordance with a set of single bit control signals, wherein the first ratcheting distributor includes a first rotating selector for generating the set of single bit control signals such that a different one of the set of single bit control signals has a unique state in a given clock cycle;
a number of outputs, each output capable of providing the data stream previously stored in the memory; and
a second ratcheting distributor for providing the data stream distributed across the number of memory banks to either of the number of outputs.

13. A memory as recited in claim 12, wherein the first ratcheting distributor comprises:
a number of multiplexers, each of the number of multiplexers connected to receive the number of inputs, each of the number of multiplexers having an output connected to a different one of the number of memory banks, each of the number of multiplexers connected to receive a different selector signal defined by a particular sequence of the set of single bit control signals, the different selector signal being defined to control which of the number of inputs received by the multiplexer is to be transmitted to the output of the multiplexer for storage in one of the number of memory banks.

14. A memory as recited in claim 13, wherein one of the number of single bit control signals has a first digital state and each of a remainder of the single bit control signals has a second digital state, the rotating selector defined to cause a different one of the number of single bit control signals to have the first digital state on successive cycles of the clock such that the first digital state rotates in a fixed sequence among the number of single bit control signals on successive cycles of the clock.

15. A memory as recited in claim 13, wherein the number of multiplexers and the different selector signal received by each of the number of multiplexers in each cycle of the clock causes the data stream received by each of the number of inputs to be distributed across the number of memory banks.

16. A memory as recited in claim 12, wherein the second ratcheting distributor comprises:
a number of output multiplexers, each of the number of output multiplexers connected to receive an input from each of the number of memory banks, each of the number of output multiplexers having an output representing one of the number of outputs, each of the number of output multiplexers connected to receive a different selector signal in each cycle of a clock, the different selector signal being defined to control which input received from each of the number of memory banks is to be transmitted to the output in each cycle of the clock; and
a second rotating selector for generating a number of single bit signals to be used to define the different selector signal received by each of the number of output multiplexers.

17. A memory as recited in claim 16, wherein one of the number of single bit signals has a first digital state and each of a remainder of the single bit signals has a second digital state, the second rotating selector defined to generate the number of single bit signals in each cycle of the clock, the second rotating selector further defined to cause a different one of the number of single bit signals to have the first digital state on successive cycles of the clock such that the first digital state rotates in a fixed sequence among the number of single bit signals on successive cycles of the clock.

18. A memory as recited in claim 16, wherein the different selector signal received by one of the number of output multiplexers in each cycle of the clock causes a portion of the data stream contained within the number of memory banks to be provided to the output on successive clock cycles such that the data stream is provided to the output.

19. A method for operating a memory, comprising:
receiving a number of inputs, each of the number of inputs representing a data stream to be stored in the memory, each of the number of inputs being received simultaneously;
distributing the data stream associated with each of the number of inputs across a number of memory banks in accordance with a set of single bit control signals, wherein a portion of the data stream is stored in each of the number of memory banks as required to completely store the data stream; and
generating the set of single bit control signals such that a different one of the set of single bit control signals has a unique state in a given clock cycle, the unique state indicating which data stream is to have a portion of itself stored in a particular memory bank in the given clock cycle.

20. A method for operating a memory as recited in claim 19, further comprising:
using a ratcheting distributor to distribute the data stream associated with each of the number of inputs across the number of memory banks.

21. A method for operating a memory as recited in claim 20, wherein using the ratcheting distributor includes operating a number of multiplexers, each of the number of multiplexers being operated to receive the number of inputs, each of the number of multiplexers being further operated to receive a selector signal defined by a particular sequence of the set of single bit control signals, the selector signal used to control which of the number of inputs is transmitted to an output connected to one of the number of memory banks.

22. A method for operating a memory as recited in claim 21, wherein the selector signal is different for each of the number of multiplexers on each cycle of a clock, the selector signal for each of the number of multiplexers being repeated on a clock cycle count that is a multiple of the number of inputs.

23. A method for operating a memory as recited in claim 19, further comprising:
retrieving the portion of the data stream stored in each of the number of memory banks; and transmitting the portion of the data stream stored in each of the number of memory banks to an output, the transmitting causing the data stream to be provided at the output.

24. A method for operating a memory as recited in claim 23, wherein the retrieving and the transmitting of the portion of the data stream stored in each of the number of memory banks is perform simultaneously for a number of data streams, each of the number of data streams being transmitted to different outputs.

25. A method for operating a memory as recited in claim 23, further comprising:

using a ratcheting distributor to retrieve and transmit the portion of the data stream stored in each of the number of memory banks.

26. A method for operating a memory as recited in claim 25, wherein using the ratcheting distributor includes operating a number of multiplexers, each of the number of multiplexers being operated to receive the portion of the data stream stored in each of the number of memory banks, each of the number of multiplexers being further operated to receive a selector signal for controlling which portion of the data stream stored in each of the number of memory banks is transmitted to the output.

27. A method for operating a memory as recited in claim 26, wherein using the ratcheting distributor further includes generating the selector signal received by each of the number of multiplexers, the selector signal being different for each of the number of multiplexers on each cycle of a clock, the selector signal for each of the number of multiplexers being repeated on a clock cycle count that is a multiple of the number of memory banks.

* * * * *